United States Patent
Cao et al.

(10) Patent No.: US 11,496,926 B2
(45) Date of Patent: Nov. 8, 2022

(54) EHT PADDING AND PACKET EXTENSION METHOD AND APPARATUS

(71) Applicant: NXP USA, Inc., Austin, TX (US)

(72) Inventors: Rui Cao, Sunnyvale, CA (US); Sudhir Srinivasa, Los Gatos, CA (US); Hongyuan Zhang, Fremont, CA (US); Mao Yu, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/319,060

(22) Filed: May 12, 2021

(65) Prior Publication Data

US 2021/0360472 A1 Nov. 18, 2021

Related U.S. Application Data

(60) Provisional application No. 63/067,904, filed on Aug. 20, 2020, provisional application No. 63/057,217, (Continued)

(51) Int. Cl.
*H04W 28/06* (2009.01)
*H04L 27/26* (2006.01)
(Continued)

(52) U.S. Cl.
CPC ......... *H04W 28/06* (2013.01); *H04L 27/2607* (2013.01); *H04L 69/04* (2013.01); *H04W 72/04* (2013.01)

(58) Field of Classification Search
None
See application file for complete search history.

(56) References Cited

U.S. PATENT DOCUMENTS

| | | | |
|---|---|---|---|
| 10,230,490 B2 | 3/2019 | Sun et al. | |
| 10,447,519 B2 | 10/2019 | Huang et al. | |
| 10,833,828 B2 | 11/2020 | Wang et al. | |
| 10,944,502 B2 | 3/2021 | Sun et al. | |
| 2015/0349995 A1 | 12/2015 | Zhang et al. | |

(Continued)

FOREIGN PATENT DOCUMENTS

| | | |
|---|---|---|
| EP | 3654559 A1 | 5/2020 |
| WO | WO 2017122240 A1 | 7/2017 |

OTHER PUBLICATIONS

Cailian Deng et al., IEEE 802.11be—Wi-Fi 7: New Challenges and Opportunities, IEEE, 2020 https://arxiv.org/pdf/2007.13401.pdf.
(Continued)

*Primary Examiner* — Diane L Lo

(57) ABSTRACT

In an 802.11be wireless system, data units are generated for transmission by configuring a transmitting device to process encoding parameters, including a first encoding parameter $N_{SD}$ and a second encoding parameter $N_{SD,short}$, to select a padding boundary from pre-defined padding boundaries in the last symbol that will most closely include the number of information bits $N_{EXCESS}$ in the last symbol and to append padding bits to the number of information bits $N_{EXCESS}$ to fill up to the selected padding boundary in the last symbol, thereby generating pre-encoded data bits which are encoded for data transmission, where at least the first encoding parameter $N_{SD}$ is specified for an aggregated resource unit size that is allowed under the 802.11be protocol as a sum of $N_{SD}$ values for at two other resource units.

22 Claims, 10 Drawing Sheets

Related U.S. Application Data filed on Jul. 27, 2020, provisional application No. 63/026,935, filed on May 19, 2020, provisional application No. 63/023,371, filed on May 12, 2020.

(51) Int. Cl.
*H04L 69/04* (2022.01)
*H04W 72/04* (2009.01)

(56) References Cited

U.S. PATENT DOCUMENTS

| | | | |
|---|---|---|---|
| 2016/0227437 A1* | 8/2016 | Blanksby | H04L 1/00 |
| 2016/0241682 A1* | 8/2016 | Xu | H04L 69/22 |
| 2016/0282858 A1 | 9/2016 | Michalscheck et al. | |
| 2016/0286012 A1* | 9/2016 | Yu | H04L 27/2628 |
| 2017/0332385 A1 | 11/2017 | Shirali et al. | |
| 2018/0302256 A1* | 10/2018 | Huang | H04L 5/0094 |
| 2020/0037325 A1 | 1/2020 | Chu et al. | |
| 2022/0095347 A1* | 3/2022 | Huang | H04W 72/1278 |

OTHER PUBLICATIONS

New H3C Technologies Co., Ltd., 802.11ax Technology White Paper, 2020.

Taewon Song et al., Performance Analysis of Synchronous Multi-Radio Multi-Link MAC Protocols in IEEE 802.11be Extremely High Throughput WLANs, Applied Sciences, 2021, 11, 317.

Evgeny Khorov et al., Current Status and Directions of IEEE 802.11be, the Future WiFi 7, May 8, 2020.

Yusuke Asai, New Wireless LAN Technology: 802.11ax, Nippon Telegraph and Telephone Corporation, MIC MRA International Workshop 2019, Mar. 7, 2019.

Dongguk Lim, IEEE P802.11 Wireless LANs, PDT-PHY-EHT-PPDU-Format-Update, Nov. 18, 2020.

IEEE, IEEE P802.11ax/D6.1 Draft Standard for Information Technology—Telecommunications and information exchange between systems local and metropolitan area networks—specific requirements, Part 11: Wireless LAN Medium Access Control (MAC) and Physical Layer (PHY) Specifications, Amendment 1: Enhancements for High Efficiency WLAN, May 2020.

U.S. Appl. No. 17/386,242, filed Jul. 27, 2021.

Mengshi Hu et al., IEEE P802.11 Wireless LANs, Proposed Draft Text: Nominal Packet Padding Values Selection Rules, Mar. 2021, 5 pages.

Mengshi Hu et al., IEEE P802.11 Wireless LANs, Proposed Draft Text: EHT PPE Thresholds field, Mar. 2021, 8 pages.

Hongyuan Zhang et al., IEEE P802.11 Wireless LANs, PPE Threshold Field, Mar. 5, 2018, 4 pages.

* cited by examiner

| RU Size | $N_{SD}$ | $N_{SD,short}$ | |
|---|---|---|---|
| | DCM=0 | DCM=0 | DCM=1 |
| 26 | 24 | 6 | 2 |
| 52 | 48 | 12 | 6 |
| 52+26 | 72 | 18 | 8 |
| 106 | 102 | 24 | 12 |
| 106+26 | 126 | 30 | 14 |
| 242 | 234 | 60 | 30 |
| 484 | 468 | 120 | 60 |
| 484+242 | 702 | 180 | 90 |
| 996 | 980 | 240 | 120 |
| 996+484 | 1448 | 360 | 180 |
| 996+(484+242) | 1682 | 420 | 210 |
| 2x996 | 1960 | 492 | 246 |
| 2x996+484 | 2428 | 612 | 306 |
| 3x996 | 2940 | 732 | 366 |
| 3x996+484 | 3408 | 852 | 426 |
| 4x996 | 3920 | 984 | 492 |

Figure 5

| RU Size | $N_{SD}$ | | $N_{SD,short}$ | |
|---|---|---|---|---|
| | DCM=0 | DCM=1 | DCM=0 | DCM=1 |
| 26 | 24 | 6 | 6 | 2 |
| 52 | 48 | 12 | 12 | 6 |
| 52+26 | 72 | 18 | 18 | 8 |
| 106 | 102 | 24 | 24 | 12 |
| 106+26 | 126 | 30 | 30 | 16 |
| 242 | 234 | 60 | 60 | 30 |
| 484 (242+242) | 468 | 120 | 120 | 60 |
| 484+242 | 702 | 174 | 180 | 88 |
| 996 | 980 | 240 | 240 | 120 |
| 996+484 or 996+(242+242) | 1448 | 360 | 360 | 180 |
| (484+242)+(484+242) | 1404 | 354 | 348 | 176 |
| 996+(484+242) | 1682 | 420 | 420 | 210 |
| 2x996 | 1960 | 492 | 492 | 246 |
| 2x996+484 | 2428 | 606 | 612 | 304 |
| 3x996 | 2940 | 738 | 732 | 368 |
| 3x996+484 | 3408 | 852 | 852 | 426 |
| 4x996 | 3920 | 978 | 984 | 490 |

Figure 6A

| RU Size | $N_{SD}$ | | $N_{SD,short}$ | |
|---|---|---|---|---|
| | DCM=0 | DCM=1 | DCM=0 | DCM=1 |
| 26 | 24 | 6 | 6 | 2 |
| 52 | 48 | 12 | 12 | 6 |
| 52+26 | 72 | 18 | 18 | 8 |
| 106 | 102 | 24 | 24 | 12 |
| 106+26 | 126 | 36 | 36 | 18 |
| 242 | 234 | 60 | 60 | 30 |
| 484 (242+242) | 468 | 120 | 120 | 60 |
| 484+242 | 702 | 180 | 180 | 90 |
| 996 | 980 | 240 | 240 | 120 |
| 996+484 or 996+(242+242) | 1448 | 360 | 360 | 180 |
| (484+242)+(484+242) | 1404 | 348 | 348 | 174 |
| 996+(484+242) | 1682 | 420 | 420 | 210 |
| 2x996 | 1960 | 492 | 492 | 246 |
| 2x996+484 | 2428 | 612 | 612 | 306 |
| 3x996 | 2940 | 732 | 732 | 366 |
| 3x996+484 | 3408 | 852 | 852 | 426 |
| 4x996 | 3920 | 984 | 984 | 492 |

Figure 6B

EHT PADDING AND PACKET EXTENSION METHOD AND APPARATUS

CROSS-REFERENCE TO RELATED APPLICATION AND PRIORITY CLAIM

This application claims the benefit of U.S. Provisional Patent Application No. 63/023,371 entitled "EHT PE Calculation and Signaling" filed May 12, 2020, U.S. Provisional Patent Application No. 63/057,217 entitled "EHT PE Calculation and Signaling—r1" filed Jul. 27, 2020, U.S. Provisional Patent Application No. 63/067,904 entitled "EHT PE Calculation and Signaling" filed Aug. 20, 2020, U.S. Provisional Patent Application No. 63/026,935 entitled "EHT Encoding Parameters for 11be PPDUs with large BW and MRU" filed May 19, 2020, and each of which is incorporated by reference in its entirety as if fully set forth herein.

BACKGROUND

Field

The present disclosure is directed in general to communication networks. In one aspect, the present disclosure relates generally to wireless local area network (WLAN) implementing the Institute of Electrical and Electronics Engineers (IEEE) 802.11 standard and any other standards and/or networks that can provide wireless transfer of data in outdoor deployments, outdoor-to-indoor communications, and device-to-device (P2P) networks.

Description of the Related Art

An ever-increasing number of relatively inexpensive, low power wireless data communication services, networks and devices have been made available over the past number of years, promising near wire speed transmission and reliability. Enabling technology advances in the area of wireless communications, various wireless technology standards (including for example, the IEEE Standards 802.11a/b/g, 802.11n, 802.11ac and 802.11ax and their updates and amendments, as well as the IEEE Standard 802.11be now in the process of being developed) have been introduced that are known to persons skilled in the art and are collectively incorporated by reference as if set forth fully herein fully. For example, recent proposals for the latest 802.11be standard provide higher data rates and improved transmission efficiencies between wireless devices by, inter alia, adding multiple-RU (resource unit) support for client stations and increasing the modulating order, the signaling bandwidth, and the number of spatial streams. However, such additions are not supported existing encoding schemes, and the existing solutions for providing wireless data communication services with higher data rates and improved transmission efficiencies are extremely difficult at a practical level by virtue of the difficulty in balancing increased data signaling with the overhead, processing, and timings costs required for signaling and processing higher data rates.

BRIEF DESCRIPTION OF THE DRAWINGS

The present invention may be understood, and its numerous objects, features and advantages obtained, when the following detailed description of a preferred embodiment is considered in conjunction with the following drawings.

FIG. 5 depicts a first table of expanded $N_{SD}$ and $N_{SD,short}$ values for use with encoding EHT data frames wherein multiple resource units (MRUs) are assigned to a single user station in accordance with selected first embodiments of the present disclosure.

FIG. 6A depicts a second table of expanded $N_{SD}$ and $N_{SD,short}$ values for use with encoding EHT data frames wherein MRUs are assigned to a single user station in accordance with selected second embodiments of the present disclosure.

FIG. 6B depicts a third table of expanded $N_{SD}$ and $N_{SD,short}$ values for use with encoding EHT data frames wherein MRUs are assigned to a single user station in accordance with selected third embodiments of the present disclosure.

DETAILED DESCRIPTION

A system, apparatus, and methodology are described wherein wireless communication station (STA) devices compute padding and packet extension parameters which accommodate wider bandwidth and multiple resource unit assignments provided for orthogonal frequency-division multiplexing (OFDM) modulated symbols supported by emerging 802.11 standards, such as 802.11be. In selected embodiments when encoding EHT data frames which allow up to 320 MHz PPDUs, 16 spatial streams, and punctured transmissions, a new padding procedure and encoding device employ special padding rules which use a predetermined set of expanded $N_{SD}$ and $N_{SD,short}$ values to compute pre-FEC padding values for new resource unit (RU) sizes. In selected embodiments, the $N_{SD}$ value for aggregated RUs is computed as the sum of the $N_{SD}$ values of all component RUs, and the $N_{SD,short}$ value for aggregated RUs may be computed as the sum of the $N_{SD,short}$ values of all component RUs. In other embodiments, the $N_{SD,short}$ values are defined to be as close as possible to $N_{SD}/4$ values. In yet other embodiments, the $N_{SD,short}$ values (DCM=0) are defined to be twice as large as $N_{SD,short}$ values (DCM=1) for larger resource units (e.g., RUs≥106). In still yet other embodiments, the $N_{SD,short}$ values are chosen to guarantee that the $N_{DBPS,short}$ value will be an integer. And to account for receiver delays in processing higher data rates that are supported by emerging 802.11 standards, new packet extension procedures are provided for use at the encoding device which is designed to signal and provide longer packet extensions, thereby extending the PPDU energy and providing more time for receiver to process the data portion and send acknowledge (ACK) or block ACK (BA). In selected embodiments, a first packet extension procedure maintains a first maximum nominal packet extension value (e.g., 16 µs) while providing a flexible pre-FEC padding factor. In other selected embodiments, a second packet extension procedure uses a second, larger maximum nominal packet extension value (e.g., 20 µs) which is signaled by the transmitter with a single ambiguity bit. In selected embodiments, the second, larger maximum nominal packet extension value may be increased (e.g., up to 28 µs) with increases in the guard interval duration which are chosen by the transmitter based on the receiver's PE capability and pre-FEC factor. In yet other selected embodiments, a third packet extension procedure uses a third, larger maximum nominal packet extension value (e.g., up to 40 µs) which is signaled by the transmitter with two ambiguity bits.

Figure 1:
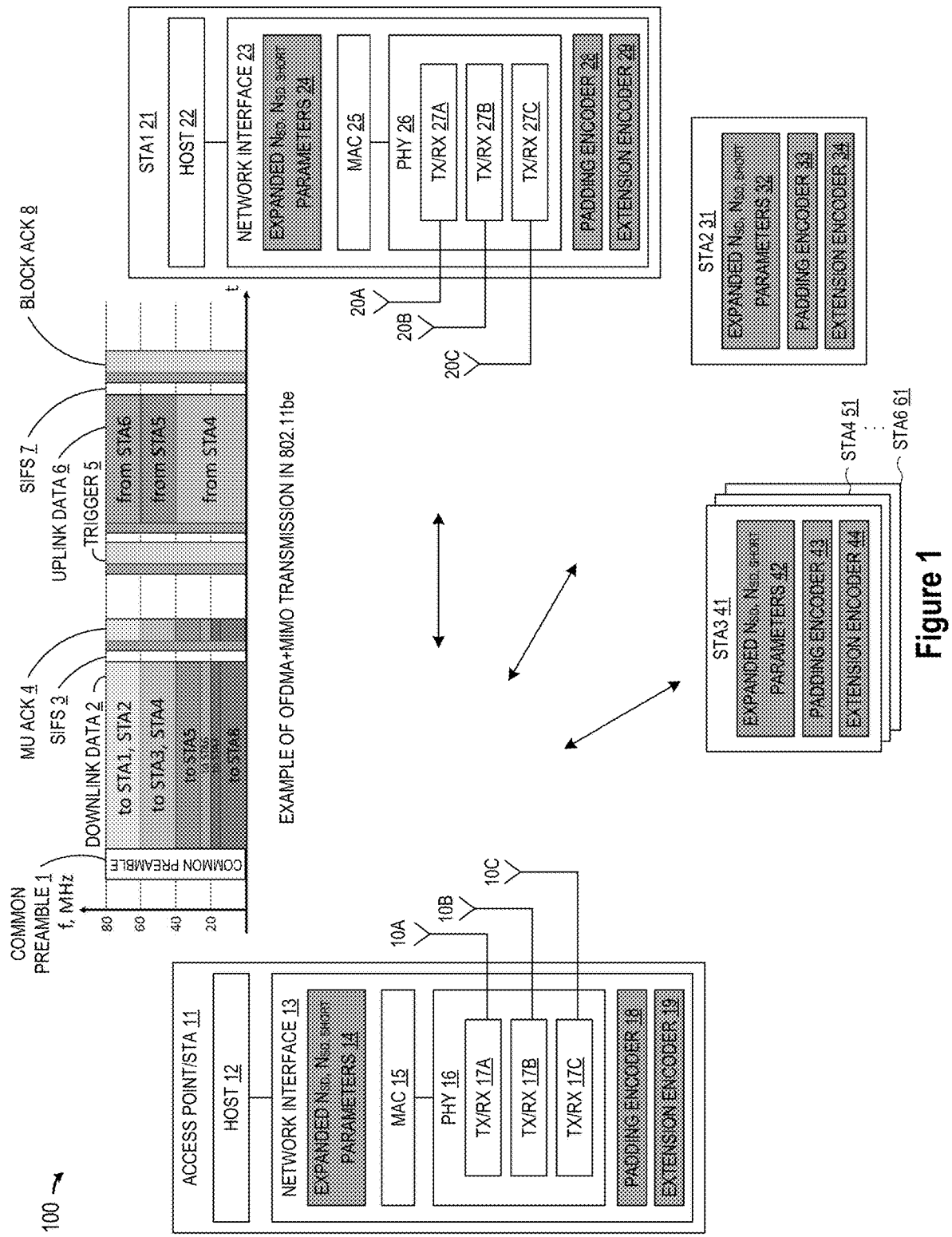
FIG. 1 is a block diagram of a wireless local area network (WLAN) in which wireless communication station (STA) devices transmit and receive data frames in accordance with selected embodiments of the present disclosure.

To provide a contextual understanding for selected embodiments of the present disclosure, reference is now made to FIG. 1 which shows a block diagram of a wireless local area network (WLAN) 100 in which an access point (AP) station (STA) 11 and one or more wireless devices 21, 31, 41, 51, 61 transmit and receive data frames 2, 6. As depicted, the AP 11 includes a host processor 12 coupled to a network interface 13. In selected embodiments, the network interface 13 includes one or more integrated circuits (IC) devices configured to operate a local area network (LAN) protocol. To this end, the network interface 13 may include a medium access control (MAC) processor 15 and a physical layer (PHY) processor 16. In selected embodiments, the MAC processor 15 is implemented as an 802.11be MAC processor 15, and the PHY processor 16 is implemented as an 802.11be PHY processor 16. The PHY processor 16 includes a plurality of transceivers 17 which are coupled to a plurality of antennas 10. Although three transceivers 17A-C and three antennas 10A-C are illustrated, the AP 11 may use any suitable number of transceivers 17 and antennas 10 in other embodiments. In addition, the AP 11 may have more antennas 10 than transceivers 17, in which case antenna switching techniques are used to switch the antennas 10 between the transceivers 17. In selected embodiments, the MAC processor 15 is implemented with one or more integrated circuit (IC) devices, and the PHY processor 16 is implemented on one or more additional IC devices. In other embodiments, at least a portion of the MAC processor 15 and at least a portion of the PHY processor 16 are implemented on a single IC device. In various embodiments, the MAC processor 15 and the PHY processor 16 are configured to operate according to at least a first communication protocol (e.g., 802.11be). In other embodiments, the MAC processor 15 and the PHY processor 16 are also configured to operate according to one or more additional communication protocols (e.g., according to the IEEE 802.11ax Standard). Using the communication protocol(s), the AP device 11 is operative to create a wireless local area network (WLAN) 100 in which one or more client stations (e.g., 21) may communicate with the AP 11 and/or with other client stations (e.g., 31, 41) located within the WLAN 100. Although six client stations 21, 31, 41, 51, 61 are illustrated in FIG. 1, the WLAN 100 may include any suitable number of client stations in various scenarios and embodiments.

At least one of the client stations (e.g., client station 21) is configured to operate at least according to the first communication protocol. To this end, the client station 21 includes a host processor 22 coupled to a network interface 23. In selected embodiments, the network interface 23 includes one or more IC devices configured to operate as discussed below. For example, the depicted network interface 23 may include a MAC processor 25 and a PHY processor 26. In selected embodiments, the MAC processor 25 is implemented as an 802.11be MAC processor 25, and the PHY processor 26 is implemented as an 802.11be PHY processor 26. The PHY processor 26 includes a plurality of transceivers 27 coupled to a plurality of antennas 20. Although three transceivers 27A-C and three antennas 20A-C are illustrated, the client station 21 may include any suitable number of transceivers 27 and antennas 20. In addition, the client station 21 may include more antennas 20 than transceivers 27, in which case antenna switching techniques are used. In selected embodiments, the MAC processor 25 is implemented on at least a first IC device, and the PHY processor 26 is implemented on at least a second IC device. In other embodiment, at least a portion of the MAC processor 25 and at least a portion of the PHY processor 26 are implemented on a single IC device. As will be appreciated, one or both of the client stations 31, 41 may have a structure that is the same as or similar to the client station 21, though there can be structural differences.

As disclosed herein, the wireless access point (AP) station (STA) 11 transmits data streams to one or more client stations 21, 31, 41, 51, 61 in the WLAN 100. The AP 11 is configured to operate with client stations (e.g., 21) according to at least a first communication protocol which may be referred to as "extremely high throughput" or EHT communication protocol or IEEE 802.11be communication protocol. In some embodiments, different client stations in the vicinity of the AP 11 are configured to operate according to one or more other communication protocols which define operation in some of the same frequency band(s) as the EHT communication protocol but with generally lower data throughputs. Such lower data throughput communication protocols (e.g., IEEE 802.11a, IEEE 802.11n, IEEE 802.11ac and/or 802.11ax) are collectively referred herein as "legacy" communication protocols.

In the context of the present disclosure, it will be understood by those skilled in the art that the IEEE 802.11 standard (a.k.a., Wi-Fi) has been amended to provide very data throughput performance in real-world, high density scenarios. For example, there are advanced Physical Layer techniques being addressed in IEEE 802.11be standard which add more flexibility to the orthogonal frequency-division multiple access (OFDMA) modulation schemes by increasing (i) the order of modulation up to 4K-QAM, (ii) the bandwidth up to 320 MHz and beyond, and (iii) the number of spatial streams in MU-MIMO up to 16. The IEEE 802.11be standard also provides new opportunities for resource allocation by allowing the AP to allocate multiple resource units (RUs) to a client station. Unfortunately, existing 802.11 wireless encoding schemes do not support the new PHY features which provide higher order modulation schemes, wider bandwidth, additional spatial multiplexing streams, and resource unit aggregation by client station. As a result, the data encoding and packet padding must be modified to support the improved data throughput performance with new features and additional services, while at the same time continuing to satisfy all the current use cases requirements and ensure backwards compatibility to existing IEEE 802.11 standards.

To illustrate these challenges, reference is made to FIG. 1 which depicts an example OFDMA and MIMO transmission sequence that is performed in the 802.11be standard. As will be appreciated, the 802.11be-compliant AP 11 uses the same scheduling approach for OFDMA as is defined in the 802.11 ax standard whereby the AP 11 can initiate a downlink multi-user data frame transmission 2 using OFDMA and/or MIMO by first transmitting a common preamble 1 with defined preamble signal information in the designated frequency bands. After a Short Interframe Space (SIFS) 3, the client station(s) process the received downlink data frame 2 and respond with a multi-user ACK (MU ACK) response. Conversely, the AP 11 may initiate a trigger-based uplink (UL) MU transmission to receive an uplink MU data frame 6 by transmitting a trigger message frame 5 with power pre-correction information in the designated frequency bands, in response to which the client station(s) transmit uplink data frames 6 and respond with a multi-user ACK (MU ACK) response. After a Short Interframe Space (SIFS) 7, the AP responds with a single "Block Ack" (BA) acknowledgment frame 8.

As indicated with the relatively short duration of the SIFS 3, the receiver client stations (e.g., 21) have a limited and fixed amount of time to process the OFDMA symbols in a transmitted downlink data frame 2, and with increased data throughput enabled by the 802.11be standard, the processing time required at the receiver/client station to process the PPDU preamble and data effectively increases, and consequently the response time for the receiver/client station to send an ACK frame 4 to the AP 11 shrinks. The same is true in the reverse direction where the short duration of the SIFS 7 provides the AP station (e.g., 11) with only a limited and fixed amount of time to process the OFDMA symbols in a transmitted uplink data frame 6 before sending a block ACK frame 8 to the client station. One solution to this problem provided in earlier protocols, such as the 802.11ax standard, is to provide some "extra" processing time by appending a packet extension (PE) signal to the end of the PPDU, where the duration of the additional PE signal is computed as a function of a pre-FEC padding a-factor and a receiving station's PE capability. Unfortunately, the maximum nominal packet padding defined for the 802.11ax standard is 16 us, and the padding scheme for the 802.11ax standard provides for a fixed a-factor based strictly on the APEP_LENGTH and $N_{DBPS}$ parameters specified in the 802.11ax standard, thereby preventing the use of additional PE duration to account for enhancements with the 802.11be signaling scheme which increases the order of modulation up to 4K-QAM, extends the bandwidth up to 320 MHz, and expands the maximum spatial streams to 16. This constraint in computing the fixed a-factor also limits the transmitter's ability to compute the packet extension values since the 802.11ax signaling scheme computes the minimum PE values based on the fixed a-factor and the receiver's indicated PE capability. Another drawback with the encoding scheme for the 802.11 ax standard is that an AP can assign each STA only a single resource unit (RU), leading to inefficiencies in data frame transmissions.

To address one or more shortcomings of the existing 802.11 standards, the AP 11 and each client station (e.g., 21, 31, 41) is able to accommodate wider bandwidth, more number of streams, higher modulation order, and aggregated resource unit assignments by including a set of expanded $N_{SD}$ and $N_{SD,short}$ values 14, 24, 32, 42 includes the existing $N_{SD}$ and $N_{SD,short}$ values specified in the 802.11 ax standard, but also includes additional $N_{SD}$ and $N_{SD,short}$ values which cover the allowed sizes for multiple or aggregated RUs. In selected embodiments, the expanded $N_{SD}$ and $N_{SD,short}$ values are stored as tables 14, 24, 32, 42 in the stations 11, 21, 31, 41), where the $N_{SD}$ value for aggregated RUs is the sum of the $N_{SD}$ values of all component RUs, and where the $N_{SD,short}$ value for aggregated RUs is the sum of the $N_{SD,short}$ values of all component RUs. In other embodiments, the $N_{SD,short}$ values in the expanded $N_{SD}$ and $N_{SD,short}$ value tables 14, 24, 32, 42 are defined to be as close as possible to $N_{SD}/4$ values. In yet other embodiments, the $N_{SD,short}$ values (DCM=0) in the expanded $N_{SD}$ and $N_{SD,short}$ value tables 14, 24, 32, 42 are defined to be twice as large as $N_{SD,short}$ values (DCM=1) for larger resource units (e.g., RUs≥106). In still yet other embodiments, the expanded $N_{SD}$ and $N_{SD,short}$ values includes $N_{SD,short}$ values that are chosen to guarantee that the $N_{DBPS,short}$ value will be an integer.

With access to the expanded $N_{SD}$ and $N_{SD,short}$ values 14, 24, 32, 42, each station (e.g., 11, 21, 31, 41) includes an EHT padding encoder engine 18, 28, 33, 43 which is configured to implement a two-step FEC padding computation for generating pre-FEC padding bits and post-FEC padding bits. In addition, the stations (e.g., 11, 21, 31, 41) include an EHT extension encoder engine 19, 29, 34, 44 which is configured to add a packet extension signal after the last symbol of the EHT data field prior to transmission. Each EHT padding encoder engine 18, 28, 33, 43 employs the expanded $N_{SD}$ and $N_{SD,short}$ values 14, 24, 32, 42 in special padding rules to compute a pre-FEC padding a-factor, and then uses the pre-FEC padding a-factor to compute pre-FEC padding values for new resource unit (RU) sizes which are provided in the 802.11be data frame encoding scheme. Once computed, the EHT padding encoder engine 18, 28, 33, 43 attaches the pre-FEC padding values to the excess information bits $N_{EXCESS}$ to fill up to the computed pre-FEC padding a-factor in the last symbol of the EHT data field prior to being FEC encoded to generate FEC output bits. Each padding encoder engine 18, 28, 33, 43 is also configured to compute post-FEC padding values which are attached to the FEC output bits in the last symbol of the EHT data field.

As a result of providing each station (e.g., 11, 21, 31, 41) with expanded $N_{SD}$ and $N_{SD,short}$ values 14, 24, 32, 42, each padding encoder engine 18, 28, 33, 43 may be configured to use the existing 802.11ax FEC encoding scheme to compute a pre-FEC padding value and post-FEC padding value using the 802.11ax $N_{SD}$ and $N_{SD,short}$ values from the predetermined set of expanded $N_{SD}$ and $N_{SD,short}$ values 14, 24, 32, 42. As will be appreciated, the 802.11ax $N_{SD}$ value is the parameter indicating the number of subcarrier data tones for each user, and the 802.11 ax $N_{SD,\ short}$ value is the parameter indicating roughly ¼ of the subcarrier data tones for the a-factor that is computed for the last data symbol for each user. In addition, each padding encoder engine 18, 28, 33, 43 may be configured to use the new 802.11be FEC encoding scheme to compute a pre-FEC padding value and post-FEC padding value from the new $N_{SD}$ and $N_{SD,short}$ values from the predetermined set of expanded $N_{SD}$ and $N_{SD,short}$ values 14, 24, 32, 42 which correspond to the aggregation of RUs allowed by the 802.11be protocol. To this end, the new 802.11be $N_{SD}$ value is computed as the sum of $N_{SD,i}$ values from each $RU_i$ (e.g., $N_{SD}=\Sigma N_{SD,i}$), and the 802.11ax $N_{SD,\,short}$ value is the parameter indicating roughly 14 of the subcarrier data tones used to determine the a-factor that is computed for the last data symbol for each user.

In various embodiments, the PHY processing units (e.g., 16, 26) of the AP or client stations (e.g., 11, 21) are each configured to generate data units conforming to the first communication protocol and having formats described herein. In addition, the transceiver(s) (e.g., 17, 27) is/are configured to transmit the generated data units via the antenna(s) 10, 20. Similarly, each transceiver (e.g., 17, 27) may be configured to receive data units via the antenna(s) 10, 20, and each PHY processing unit (e.g., 16, 26) is configured to process received data units conforming to the first communication protocol and having formats described herein and to determine that such data units conform to the first communication protocol.

Figure 2:
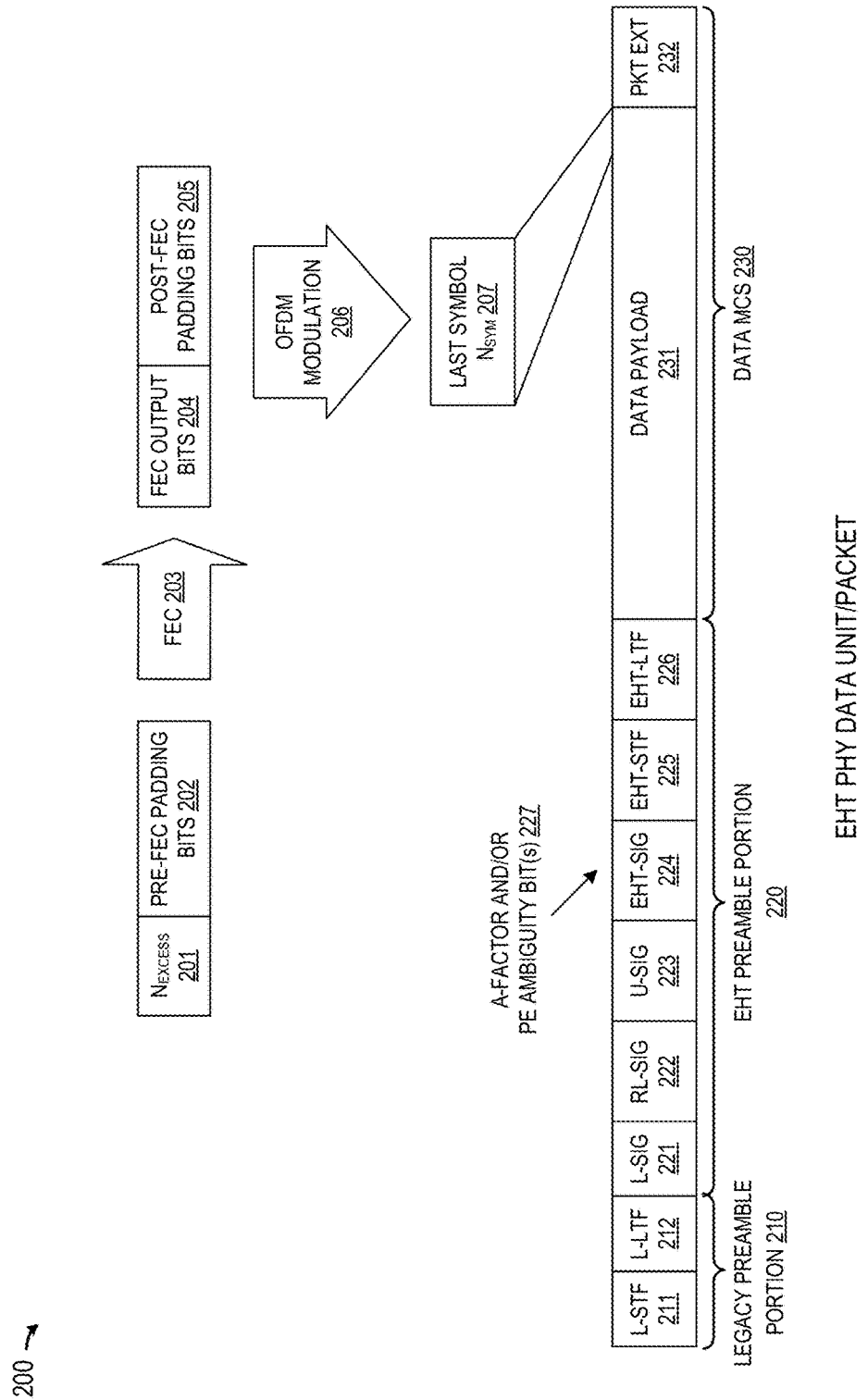
FIG. 2 illustrates an example EHT physical layer (PHY) data unit frame format which uses nominal packet padding and packet extension in accordance with selected embodiments of the present disclosure.

Reference is now made to FIG. 2 which illustrates an example EHT physical layer (PHY) data unit 200 having a frame format which uses two-step FEC padding and packet extension in accordance with selected embodiments of the present disclosure. As disclosed, each station (e.g., 11, 21, 31, 41) may be configured to transmit the EHT PHY data unit 200 to a receiving station (e.g., client station 21), where the data unit 200 conforms to the EHT communication protocol and occupies a 20 MHz bandwidth. Data units similar to the data unit 200 occupy other suitable bandwidth such as 40 MHz, 80 MHz, 160 MHz, 320 MHz, for example, or other suitable bandwidths, in other embodiments.

As shown, the data unit 200 includes a legacy preamble portion 210 and an EHT preamble portion 220. The legacy preamble portion 210 includes a legacy short training field (L-STF) 211 and a legacy long training field (L-LTF) 212. The EHT preamble portion 220 includes a legacy signal field (L-SIG) 221, a repeat legacy signal field (RL-SIG) 222, a long universal signal field (U-SIG) 223, an EHT signal field (EHT-SIG) 224, an EHT short training field (EHT-SFT) 225, and an EHT long training field (EHT-LTF) 226. Each of the L-STF 2111, the L-LTF 212, the L-SIG 221, the RL-SIG 222, the U-SIG 223, the EHT-SIG 224, the EHT-STF 225, and the EHT-LFT 226 includes an integer number of one or more OFDM symbols. For example, the U-SIG field 223 may include information specifying the bandwidth (BW) and puncture information. In addition, the EHT-SIG field 224 includes common information for all users that is not included in the U-SIG field 223, including the computed a-factor and PE ambiguity bit(s) 227 for decoding the data unit 200. To accommodate all the mentioned information and ensure detection reliability to all users, the EHT-SIG field 224 can use different MCS from data MCS(s) (and can occupy a variable number of symbols which are indicated in the U-SIG field 223). For example, the EHT-SIG field 224 may include a common field and a user-specified field. In the user-specific fields, there is information about MCS, the number of space-time streams Nss, coding, the duration of the guard interval (GI setting), RU/MRU configuration or allocation, etc. In some embodiments, the PHY data unit 200 also includes a data payload portion 230.

In the course of generating the EHT PHY data unit 200, the transmitter station (e.g., AP 11) generates the last symbol $N_{SYM}$ of the data payload portion 231 by using the expanded $N_{SD}$ and $N_{SD,short}$ values (e.g., 14) at the EHT padding encoder engine (e.g., 18) to identify the closest quarter symbol or a-factor, and then compute the pre-FEC padding bits 202 which are appended to the excess information bits $N_{EXCESS}$ 201 to reach the identified a-factor. By applying forward error correction (FEC) 203 to the $N_{EXCESS}$ 201 and appended pre-FEC padding bits 202, the resulting FEC output bits 204 are appended with post-FEC padding bits 205 to reach the 4× symbol boundary. After applying OFDM modulation 206 to the FEC output bits 204 and appended post-FEC padding bits 205, the last symbol $N_{SYM}$ 207 of the data payload portion 231 is generated.

In addition, the EHT PHY data unit 200 includes a packet extension field 232 which follows the data field to provide extra time that a receiver of the EHT PHY data unit 200 may use to finish decoding the payload 231 and transmitting a response (e.g., ACK or Block ACK) to acknowledge successful (or unsuccessful) receipt of the EHT PHY data unit 200. The benefit provided by including the PE field 232 is arises from the requirement that a receiver station transmit the acknowledgement signal after a certain time period specified as a short interframe space (SIFS). However, with the higher data rate and advanced modulation technology of the EHT/802.11be communication protocol, there are a relatively larger number of bits in each OFDM symbol of the data field 231 of the data unit 200 for the receiver station to process and decode, particularly when the data unit 200 is transmitted in a transmission mode corresponding to a relatively larger bandwidth (e.g., 80 MHz, 160 MHz, 320 MHz, etc.) and/or using relatively larger number of spatial stream (e.g., larger than 8) and/or using a modulation and coding scheme (MCS) with relatively larger modulation order and/or relatively high coding rate. By providing the PE field 232 with a suitable duration or length, the receiver station is provided "extra" time from the PE field 232 to process and decode OFDM symbols of the data portion 231 and to prepare an acknowledgement frame before expiration of the SIFS after the end of the data unit 200.

In selected embodiments, the PE field 232 may use any dummy time-domain signal of the required duration, such as for example, repeating a portion or entire last data symbol signal. In other embodiments, the PE field 232 includes one or more OFDM symbols generating using a normal tone spacing and a defined guard interval of (e.g., 0.8 µs), with the duration of each OFDM symbol being 4 µs. In such embodiments, dummy bits may be appended to the post-FEC padding bits 205 prior to OFDM modulation 206, e.g., repeating a portion or the entire the modulated bits of the last OFDM symbol.

To alert or notify the receiver station about the duration of the PE field 232, the EHT preamble portion 220 may include information identifying the presence and/or the length of the PE field 232 in the data unit 200. For example, one or more PE ambiguity bits 227 may be included in the EHT-SIG field 224 to assist the receiving station with calculating the number of data symbols in the data unit 200 from the length indicated in the L-SIG field 221 and RL-SIG field 222, which includes the PE field 232. As will be appreciated, the receiver station is not required to process and/or decode the PE field 232.

As described more fully hereinbelow, the duration of packet extension field 232 may be computed with the same 802.11ax maximum nominal packet extension value (e.g., 16 µs), but with a flexibly computed pre-FEC padding factor up to a maximum a-factor such that the corresponding PE duration satisfies the receiving station's requirement. Alternatively, the pre-FEC padding factor may be computed using the 802.11ax protocol, and a second, larger maximum nominal packet extension value (e.g., 20 µs) is defined that will satisfy the condition that a single PE ambiguity bit is required for the number of data symbol calculation. In selected embodiments, the second, larger maximum nominal packet extension value may be increased (e.g., up to 28 µs) with increases in the guard interval duration which are chosen by the transmitter based on the receiver's PE capability and pre-FEC factor. Alternatively, the packet extension field 232 may be generated to use a third, larger maximum nominal packet extension value (e.g., up to 40 µs), which requires two PE ambiguity bits signaled by the transmitting station.

Figure 3A:
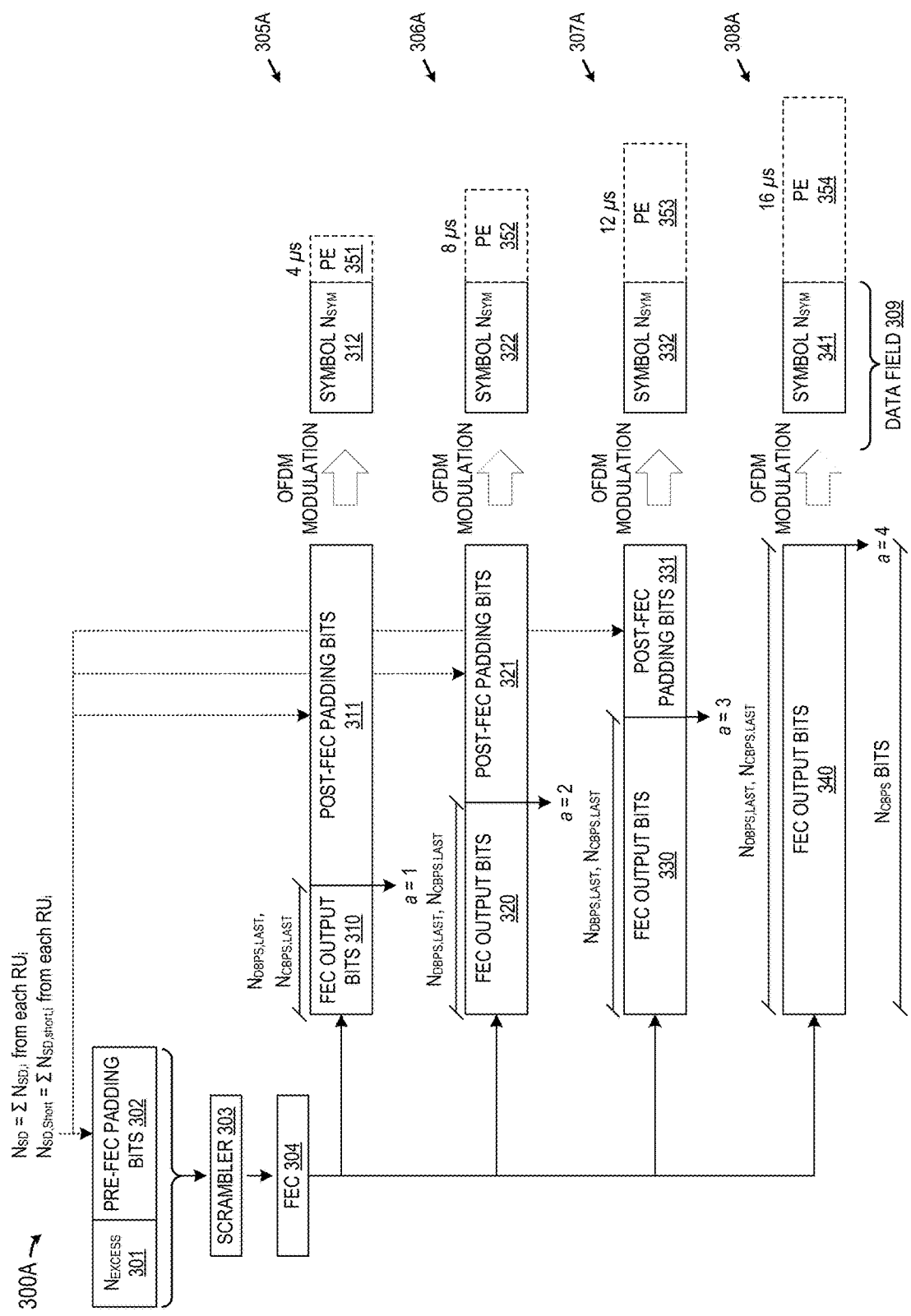
FIG. 3A is a diagrammatic illustration of EHT PHY data unit frames generated by a transmitter which computes a flexible pre-FEC padding factor and packet extensions based on a first nominal packet extension value in accordance with selected embodiments of the present disclosure.

To provide additional details for an improved understanding of selected first embodiments of the present disclosure, reference is now made to FIG. 3A which is a simplified diagrammatic illustration 300A of EHT PHY data unit frames 305A-308A generated by a transmitting station by computing a flexible pre-FEC padding a-factor for use with packet extensions based on a first nominal packet extension value (e.g., PEmax=16 µs). As a preliminary step, the transmitting station uses the excess information bits $N_{EXCESS}$ 301 and the expanded $N_{SD}$ and $N_{SD,short}$ values for new RU and MRU sizes to compute the initial a-factor $a_{init}$ having a value of 1, 2, 3, or 4 corresponding, respectively to a first boundary, second boundary, third boundary, or fourth boundary in the last OFDM symbol $N_{SYM}$ of the EHT data field 309. Based on the computed initial a-factor $a_{init}$, the transmitting station computes how many pre-FEC padding bits 302 should be appended to the excess information bits $N_{EXCESS}$ 301. After processing the excess information bits $N_{EXCESS}$ 301 and appended pre-FEC padding bits 302 with the scrambler 303 and FEC encoder 304, the transmitting station generates FEC output bits 310, 320, 330, 340 which extend, respectively, to the first, second, third, or fourth boundary in the last OFDM symbol $N_{SYM}$. For the a-factor having a value of 1, the transmitting station computes and appends post-FEC padding bits 311 to the FEC output bits 310 so that, upon OFDM modulation, the last OFDM symbol 312 of the EHT data field 309 is generated. Similarly, for the a-factor having a value of 2, the transmitting station computes and appends post-FEC padding bits 321 to the FEC output bits 320 so that, upon OFDM modulation, the last OFDM symbol 322 of the EHT data field 309 is generated. And for the a-factor having a value of 3, the transmitting station computes and appends post-FEC padding bits 331 to the FEC output bits 330 so that, upon OFDM modulation, the last OFDM symbol 332 of the EHT data field 309 is generated. Finally, for the a-factor having a value of 4, the transmitting station does not append post-FEC padding bits to the FEC output bits 340 (since they already reach the 4× symbol boundary), in which case the OFDM modulation generates the last OFDM symbol 341 of the EHT data field 309.

In addition to computing padding bits (e.g., 302, 311), the transmitting station may be configured to compute and append packet extension (PE) fields 351-354 to account for processing latencies at the receiver when processing EHT data fields which use larger bandwidths (e.g., 320 MHz) and more spatial streams (e.g., Nss=16). However, instead of using the 802.11ax approach which computes the PE duration as a function of the pre-FEC padding boundary or computed initial a-factor $a_{init}$ in the last OFDM symbol of the EHT data field 309, the transmitting station may be configured to compute an updated initial a-factor $a_{init\_upd}$ which is larger or equal to the minimum a-factor required by the receiving station. To this end, the transmitting station may first compute the initial a-factor $a_{init}$ as specified in the 802.11ax standard based on the equation.

$$a_{init} = \begin{cases} 4, & \text{if } N_{Excess} = 0 \\ \min\left(\left\lceil \frac{N_{Excess}}{m_{STBC} \cdot N_{DBPS,short}} \right\rceil, 4\right), & \text{otherwise} \end{cases}$$

where the excess information bits $N_{EXCESS}$=mod(8×APEP_LENGTH+$N_{Tail}$+$N_{service}$, $m_{STBC}$×$N_{DBSP}$), where the number of data bits per "short" OFDM symbol $N_{DBPS,short}$=$N_{CBPS,short}$×R, where $m_{STBC}$ is a space time block coding factor, and where the number of coded bits per "short" OFDM symbol $N_{CBPS,short}$=$N_{SD,short}$×$N_{SS}$×$N_{BPSCS}$. However, rather than computing the PE field (e.g., 351) from the initial a-factor $a_{init}$ as specified in the 802.11ax standard, the transmitting station is configured to effectively append a larger PE field for 320 MHz and/or large Nss data packets in situations where there is a small a-factor and where the PPDU has only one data symbol by choosing an updated a-factor to be larger or equal to the minimum a-factor $a_{min}$ required by the receiving station. To this end, the transmitting station is configured to compute an updated initial a-factor $a_{init\_upd}$=max($a_{init}$, $a_{min}$), where $a_{min}$ is the minimum a-factor that the receiving station requires. In this way, the initial a-factor $a_{init}$ can be adjusted based on the updated initial a-factor $a_{init\_upd}$ as $a_{init}$=$a_{init\_upd}$ or $a_{init}$≥$a_{init\_upd}$.

As disclosed herein, the minimum a-factor $a_{min}$ can be set to be used only with EHT packets having short packet length or payload and a high data rate PPDU (e.g., 320 MHz and Nss>8). Alternatively, the minimum a-factor $a_{min}$ can be set to one value for all cases (e.g., $a_{min}$ can only be set to non-zero value for high throughput short packet cases). The advantage of providing flexible pre-FEC padding factor is that there is no need to change the PE ambiguity signaling scheme. However, each receiving station will be required to signal or indicate its minimum a-factor $a_{min}$ requirement by capability exchange signaling. In selected embodiments, a first capability exchange signaling option is for each receiving station directly indicates its minimum a-factor value $a_{min}$ for each case. In this option, transmitting station knows the minimum a-factor $a_{min}$ and PE_nominal or PPE_threshold values for its users. In other embodiments, the capability exchange signaling is done by having each receiving station indicate the minimum PE duration for each case. In this option, the transmitting station indirectly derives the minimum a-factor values $a_{min}$ through the PE_min and PE_nominal or PPE_threshold values.

In the example of FIG. 3A, the maximum PE field duration of 16 µs is maintained, but the PE field duration is effectively increased for small a-factors (e.g., a=1) by configuring the transmitting station to compute the updated initial a-factor $a_{init\_upd}$ as the larger of the initial a-factor $a_{init}$ or the receiving station's indicated minimum a-factor $a_{min}$. As disclosed, herein, the transmitting station can choose a flexible pre-FEC padding factor based on the APEP_LENGTH parameter which is the A-MPDU length prior to end-of-frame MAC padding.

Figure 3B:
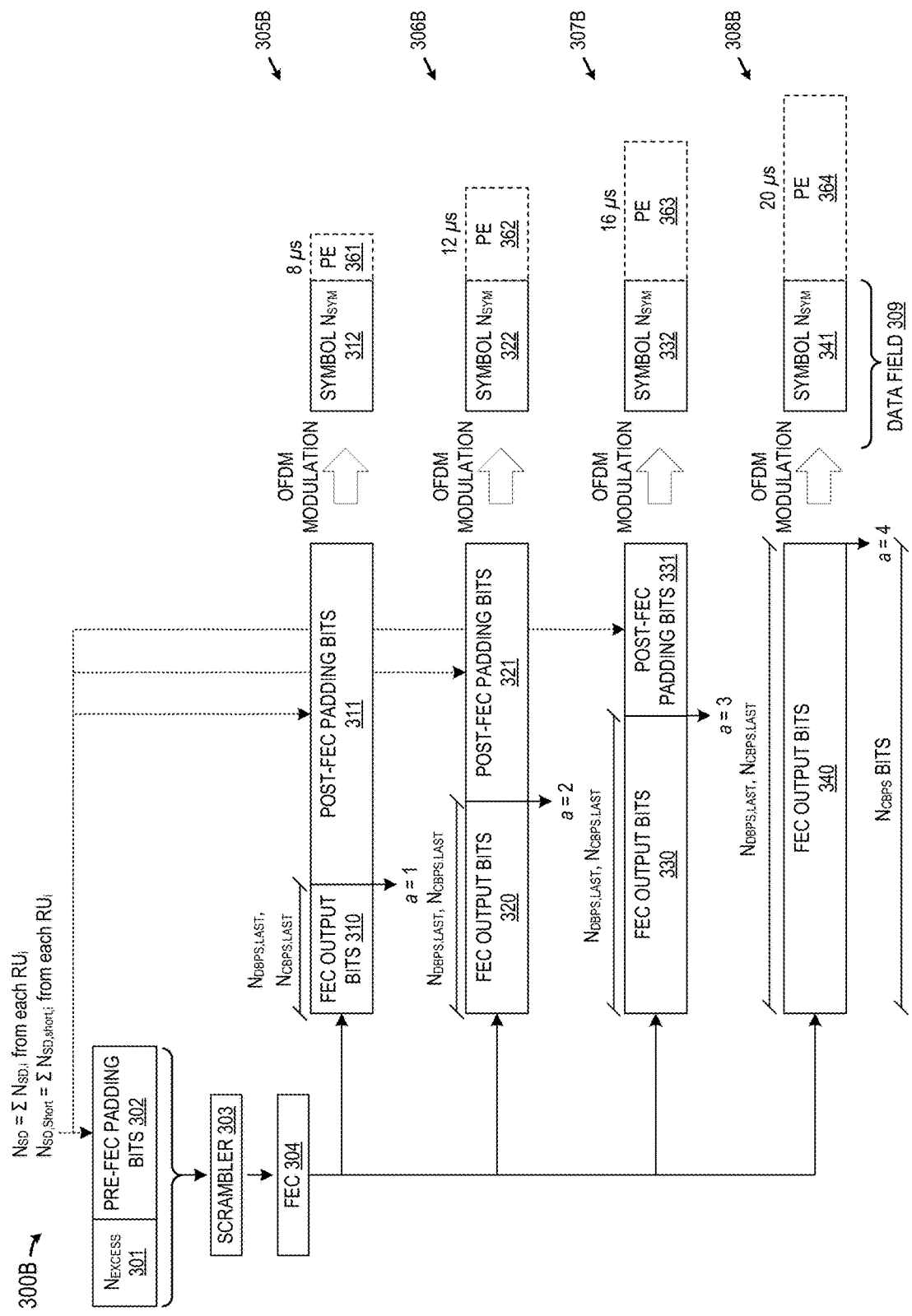
FIG. 3B is a diagrammatic illustration of EHT PHY data unit frames generated by a transmitter which computes padding factors and packet extensions based on a second, larger nominal packet extension value while using only one ambiguity bit in accordance with selected embodiments of the present disclosure.

To provide additional details for an improved understanding of selected second embodiments of the present disclosure, reference is now made to FIG. 3B which is a simplified diagrammatic illustration 300B of EHT PHY data unit frames 305B-308B generated by a transmitting station which computes padding factors and packet extensions based on a second, larger nominal packet extension value (e.g., PEmax=20 µs) while using only one ambiguity bit. As a preliminary step, the transmitting station uses the excess information bits $N_{EXCESS}$ 301 and the expanded $N_{SD}$ and $N_{SD,short}$ values for new RU and MRU sizes to compute the initial a-factor $a_{init}$ having a value of 1, 2, 3, or 4 corresponding, respectively to a first, second, third, and fourth boundaries in the last OFDM symbol $N_{SYM}$ of the EHT data field 309. Based on the computed initial a-factor $a_{init}$, the transmitting station computes pre-FEC padding bits 302 which are appended to the excess information bits $N_{EXCESS}$ 301 and processed with the scrambler 303 and FEC encoder 304 to generate FEC output bits 310, 320, 330, 340 which extend, respectively, to the first, second, third, or fourth boundary in the last OFDM symbol $N_{SYM}$. In the same way as shown in FIG. 3a for the initial a-factor $a_{init}$=1-3, the transmitting station computes and appends post-FEC padding bits 311, 321, 331 to the FEC output bits 310, 320, 330, and performs OFDM modulation to generate the last OFDM symbol 312, 322, 332, 342 of the EHT data field 309. And for initial a-factor $a_{init}$=4, the transmitting station does not append post-FEC padding bits to the FEC output bits 340 (since they already reach the 4× symbol boundary), in which case the OFDM modulation generates the last OFDM symbol 341 of the EHT data field 309.

In addition to computing padding bits (e.g., 302, 311), the transmitting station may be configured to compute and append packet extension (PE) fields 361-364 to account for processing latencies at the receiver when processing EHT data fields which use larger bandwidths (e.g., 320 MHz) and/or more spatial streams (e.g., Nss>8). However, instead of using the 802.11ax approach which has a maximum PE duration of 16 μs, the transmitting station may be configured to provide the second, larger nominal packet extension value (e.g., PEmax=20 μs) while using only one PE ambiguity bit (a.k.a., disambiguity bit). On this point, the 802.11ax specification provides that the transmitting station may be configured to set the PE ambiguity bit (e.g., the single signaling bit) to "1" if the condition in the expression shown below is TRUE, but to otherwise reset the PE ambiguity bit (single signaling bit) to "0":

$$T_{PE} + 4 \times \left( \left\lceil \frac{TXTIME - SignalExtension - 20}{4} \right\rceil - \frac{TXTIME - SignalExtension - 20}{4} \right),$$

where $T_{PE}$ is the duration of the packet extension field, where TXTIME is the packet transmit time, where SignalExtension is a signal extension duration parameter specified in the 802.11ax protocol the duration of signal extension, and where $\lceil \ \rceil$ denotes an integer ceiling operation. To be able to use only one ambiguity bit, the hidden requirement is that the value of the left side of the equation shall be less than $2 \cdot T_{SYM}$. With the maximum value of 3.2 μs for the equation term $$\left( 4 \times \left( \left\lceil \frac{TXTIME - SignalExtension - 20}{4} \right\rceil - \frac{TXTIME - SignalExtension - 20}{4} \right) \right),$$

this means that $T_{PE} < 2 \cdot T_{SYM} - 3.2$ μs. In an example of 0.8 μs guard intervals (GI), the PE time of 20 μs and TXTIME=73.6 μs, the value on the left side of the equation is 23.2 μs, which is larger than one data symbol time of 13.6 μs and less than two data symbol time of 27.2 μs. In this example, then PE ambiguity bit needs to be set to 1 to signal the receiving station to subtract one symbol (if the PE ambiguity bit is "1") or to signal that its calculation is correct (if the PE ambiguity bit is "0").

The foregoing is a special case for specifying a second, larger nominal packet extension values (e.g., PE duration is 20 μs) with a single PE ambiguity bit, and it will be appreciated that the EHT data packet format allows different nominal packet extension values as a function of the guard interval settings set by the transmitting station while still maintaining the single PE ambiguity bit. For example, with a GI setting of 0.8 μs, then the maximum PE duration of 20 μs (less than 24=27.2–3.2) can be allowed to use one-bit PE ambiguity bit. In addition, with a GI setting of 1.6 μs, the maximum allowed PE duration is 24 μs (less than 25.6=28.8–3.2). In another example with a GI setting of 3.2 μs, the maximum allowed PE duration is 28 μs (less than 28.8=32-3.2 μs).

To adhere to the constraint that only one PE ambiguity bit is used, the transmitting station may be configured to increase the maximum PE duration based on the GI settings and the pre-FEC factors. As a baseline example, if maximum PE duration is set by the receiving station's PE capability=16 μs, then any GI setting can be used for any pre-FEC factor. However, if maximum PE duration is set by the receiving station's PE capability=24 μs, then any GI setting can be used for pre-FEC factors smaller than 4. In addition, if maximum PE duration is set by the receiving station's PE capability=24 μs and the pre-FEC factor=4, then GI settings larger than 0.8 μs can be used. In addition, if maximum PE duration is set by the receiving station's PE capability=28 μs and the pre-FEC factor is less than 3, then any GI settings can be used. However, if maximum PE duration is set by the receiving station's PE capability=28 μs and the pre-FEC factor=3, then GI settings larger than 0.8 μs can be used. And if maximum PE duration is set by the receiving station's PE capability=28 μs and the pre-FEC factor=4, then GI settings larger than 1.6 μs can be used.

Figure 3C:
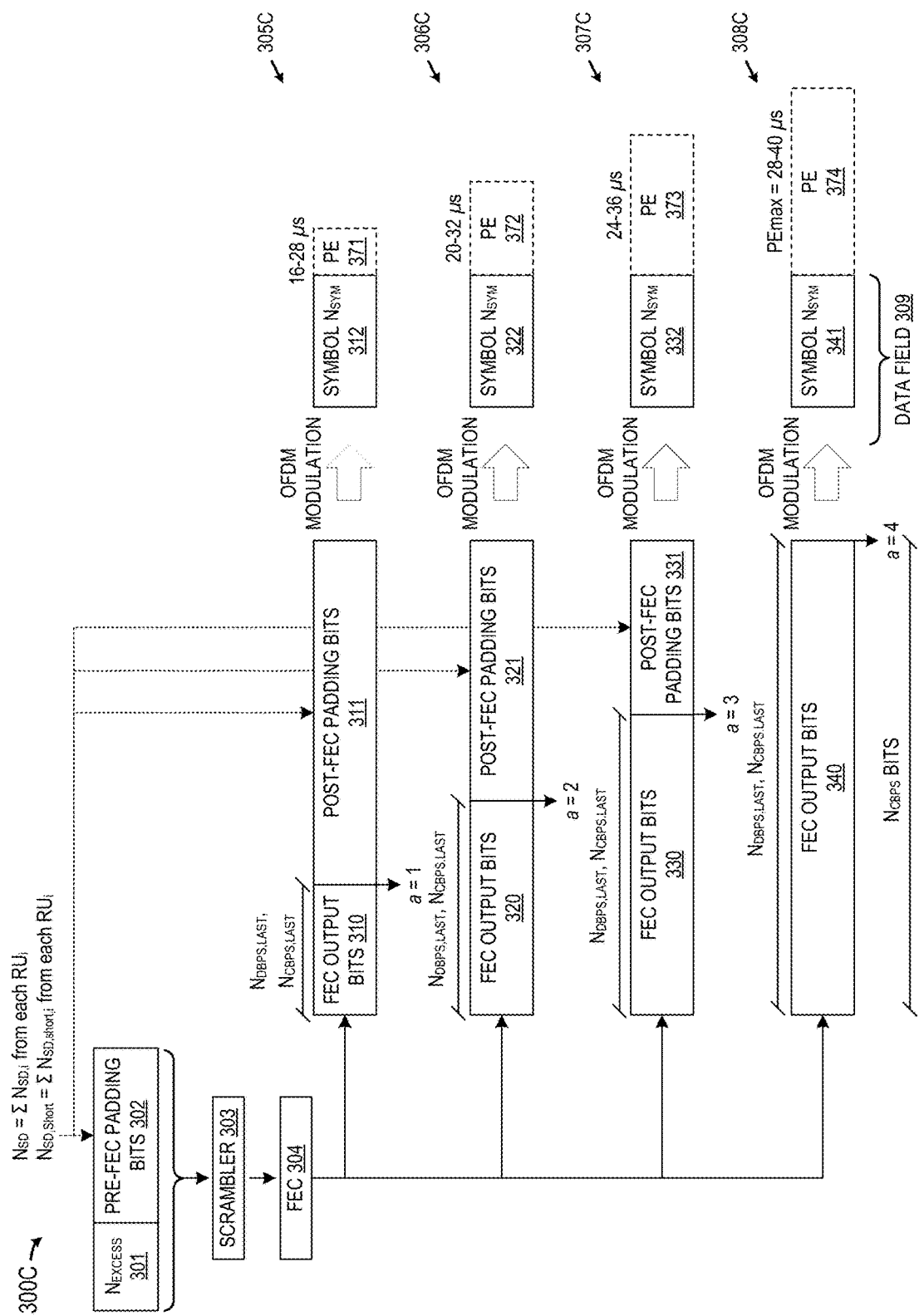
FIG. 3C is a diagrammatic illustration of EHT PHY data unit frames generated by a transmitter which computes padding factors and packet extensions based on a third, larger nominal packet extension value while using two ambiguity bits in accordance with selected embodiments of the present disclosure.

To provide additional details for an improved understanding of selected second embodiments of the present disclosure, reference is now made to FIG. 3C which is a simplified diagrammatic illustration 300C of EHT PHY data unit frames 305C-308C generated by a transmitting station which computes padding factors and packet extensions based on a third, larger nominal packet extension value (e.g., 28 μs≤PEmax≤40 μs) while using only two ambiguity bits. As a preliminary step, the transmitting station uses the excess information bits $N_{EXCESS}$ 301 and the expanded $N_{SD}$ and $N_{SD,short}$ values for new RU and MRU sizes to compute the initial a-factor $a_{init}$ having a value of 1, 2, 3, or 4 corresponding, respectively, to a first, second, third, and fourth boundaries in the last OFDM symbol $N_{SYM}$ of the EHT data field 309. Based on the computed initial a-factor $a_{init}$, the transmitting station computes pre-FEC padding bits 302 which are appended to the excess information bits $N_{EXCESS}$ 301 and processed with the scrambler 303 and FEC encoder 304 to generate FEC output bits 310, 320, 330, 340 which extend, respectively, to the first, second, third, or fourth boundary in the last OFDM symbol $N_{SYM}$. In the same way as shown in FIG. 3a for the initial a-factor $a_{init}$=1-3, the transmitting station computes and appends post-FEC padding bits 311, 321, 331 to the FEC output bits 310, 320, 330, and performs OFDM modulation to generate the last OFDM symbol 312, 322, 332, 342 of the EHT data field 309. And for initial a-factor $a_{init}$=4, the transmitting station does not append post-FEC padding bits to the FEC output bits 340 (since they already reach the 4× symbol boundary), in which case the OFDM modulation generates the last OFDM symbol 341 of the EHT data field 309.

In addition to computing padding bits (e.g., 302, 311), the transmitting station may be configured to compute and append packet extension (PE) fields 371-374 to account for processing latencies at the receiver when processing EHT data fields which use larger bandwidths (e.g., 320 MHz) and more spatial streams (e.g., Nss=16). However, instead of using the 802.11ax approach which has a maximum PE duration of 16 µs, the transmitting station may be configured to provide the third, larger nominal packet extension value (e.g., 28 µs≤PEmax≤40 µs) while using only two PE ambiguity bits (a.k.a., disambiguity bits). In such embodiments, the transmitting station may be configured to set the two PE ambiguity bits to a decimal value of "2" (e.g., PE ambiguity bits=10) if the condition in the expression shown below is TRUE:

$$T_{PE} + 4 \times \left( \left\lceil \frac{TXTIME - SignalExtension - 20}{4} \right\rceil - \frac{TXTIME - SignalExtension - 20}{4} \right)$$

In addition, the transmitting station may be configured to set the two PE ambiguity bits to a decimal value of "1" (e.g., PE ambiguity bits=01) if the condition in the expression shown below is TRUE:

$$T_{PE} + 4 \times \left( \left\lceil \frac{TXTIME - SignalExtension - 20}{4} \right\rceil - \frac{TXTIME - SignalExtension - 20}{4} \right).$$

And if neither of the foregoing expressions is true, then the transmitting station may be configured to set the two PE ambiguity bits to "0" (e.g., PE ambiguity bits=00).

With this approach of using two PE ambiguity bits, the maximum nominal packet extension value for the PE field 374 can be set to 28 µs for any GI settings, in which case the durations of the packet extension values 371, 372, 373, 374 may be set, respectively, to 16, 20, 24 and 28 µs. In other embodiments of the two PE ambiguity bits approach, the maximum nominal packet extension value for the PE field 374 can be set to 40 µs, in which case the durations of the packet extension values 371, 372, 373, 374 may be set, respectively, to 28, 32, 36 and 40 µs. Alternatively, the third, larger nominal packet extension value may be set to any desired value between 28 and 40 (e.g., 28 µs≤max nominal PE≤40 µs), in which case the durations of the packet extension values 371, 372, 373, 374 may be set, respectively, at diminishing 4 µs intervals from the larger nominal packet extension value.

Figure 4:
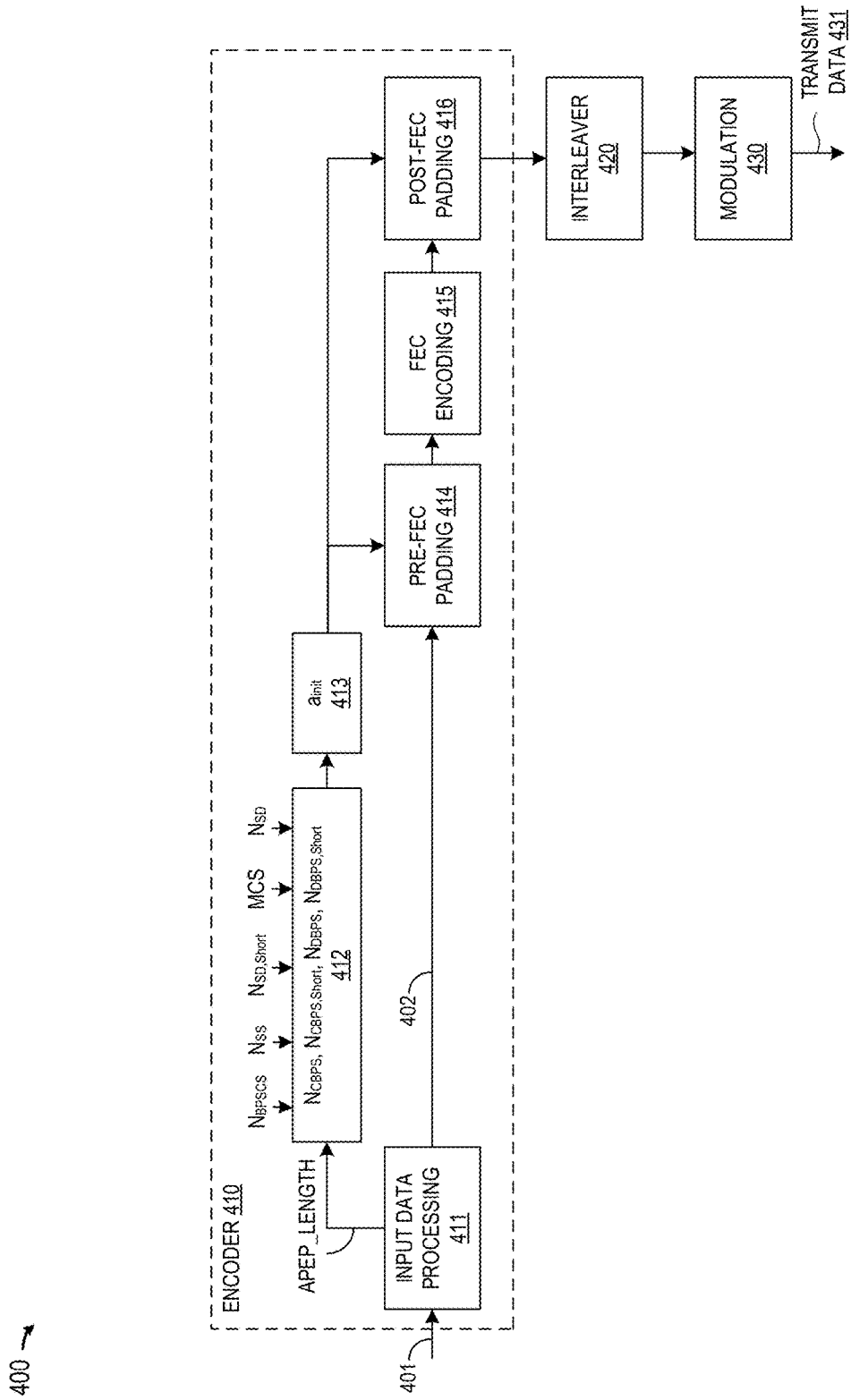
FIG. 4 is a block diagram illustrating a transceiver system that includes an EHT data encoder which employs a padding scheme in accordance with selected embodiments of the present disclosure.

To provide additional details for an improved understanding of selected embodiments of the present disclosure, reference is now made to FIG. 4 which is a block diagram illustrating a transceiver system 400 that includes an EHT data encoder 410 which employs padding scheme. As depicted, the transceiver system 400 receives input data 401 from a source, such as a processor of the system. An encoder 410 at the transceiver 400 may include an input data processing module 411 to pre-process and output data bits 402 before forward error correcting (FEC) encoding. In addition to generating output data bits 402, the input data processing module 411 may determine one or more encoding parameters, such as the APEP_LENGTH parameter which is the A-MPDU length prior to end-of-frame MAC padding. The input data processing module 411 may also extract, compute, or otherwise obtain a first set of encoding parameters, including the number of coded bits per subcarrier per spatial stream ($N_{BPSCS}$), the number of spatial streams (Nss), the number of data subcarriers for each user that is allocated one or more resource units ($N_{SD}$), the number of data subcarriers for a short symbol from each resource unit ($N_{SD,short}$), and the modulation and coding scheme (MCS). In selected embodiments, the input data processing module 411 may retrieve the encoding parameters $N_{SD}$, $N_{SD,short}$ from a table of expanded $N_{SD}$ and $N_{SD,short}$ values which define subcarrier allocation related constants for RUs in an OFDMA EHT PPDU in accordance with the 802.11be standard. Based on the first set of encoding parameters, a first encoder computational unit 412 may compute a second set of encoding parameters, including the number of coded bits per data symbol ($N_{CBPS}=N_{SD} \times Nss \times N_{BPSCS}$), the number of coded bits of a short symbol ($N_{CBPS,short}=N_{SD,short} \times N_{SS} \times N_{BPSCS}$), the number of data bits per symbol ($N_{DBPS}=N_{CBPS} \times R$), and the number of data bits of a short symbol ($N_{DBPS,short}=N_{CBPS,short} \times R$). Finally, the second set of encoding parameters are processed by the a-factor computation unit 413 to compute an initial a-factor ($a_{init}$).

At the encoder 410, the initial a-factor ($a_{init}$) is provided to a pre-FEC padding module 414 which is connected to compute a number of pre-FEC padding bits for padding information bits before passing the padded bits to the FEC encoding module 415. The initial a-factor ($a_{init}$) is also provided to a post-FEC padding module 416 which is connected to fill up the last OFDM symbol by appending post-FEC padding bits (e.g., with zero-padding bits). The padded data symbols may then be passed on to the interleaver 420 and modulation module 430 before transmitting the data 431. The data 431 may be modulated symbols output by modulation module 430.

In selected embodiments, a packet extension module (not shown) may be connected to the interleaver 420 to provide a packet extension field which is appended to the padded data symbols before being passed to the modulator. Alternatively, the packet extension module may provide a packet extension field which is appended to the modulated symbols output by modulation module 430. In either case, the packet extension module may use a first maximum nominal packet extension value (e.g., 16 µs) in cases where the a-factor computation unit 413 provides a flexible pre-FEC padding factor by choosing an a-factor that is larger or equal to the minimum a-factor required by the receiving station. Alternatively, the packet extension module may use a second, larger maximum nominal packet extension value (e.g., 20 µs) which is signaled by the transmitter with a single ambiguity bit. Alternatively, the packet extension module may increase the second, larger maximum nominal packet extension value (e.g., up to 28 µs) based on increased guard interval durations. Alternatively, the packet extension module may use third, larger maximum nominal packet extension value (e.g., up to 40 µs) which is signaled by the transmitter with two ambiguity bits.

To provide additional details for an improved understanding of selected embodiments of the present disclosure, reference is now made to FIG. 5 which depicts a first parameter table 500 of expanded $N_{SD}$ and $N_{SD,short}$ values for use with encoding EHT data frames wherein one or more multiple resource units (MRUs) may be assigned to a single user station. In the white rows of the disclosed parameter table 500, there are listed $N_{SD}$ and $N_{SD,short}$ values for each RU size (26, 52, 106, 242, 484, 996, 2×996) which, under the 802.11ax standard, could be assigned to single user. For example, a resource unit having 26 tones would have assigned encoding parameter values of $N_{SD}$=24, $N_{SD,short}$=6 when dual carrier modulation (DCM) is not used (e.g., DCM=0), and $N_{SD,short}$=2 when DCM is used (e.g., DCM=1). In addition, a resource unit having 52 tones would have assigned encoding parameter values of $N_{SD}$=48, $N_{SD,short}$=12 when DCM is not used (e.g., DCM=0), and $N_{SD,short}$=6 when DCM is used (e.g., DCM=1). The additional encoding parameter value entries in the parameter table 500 continue until reaching the entry for the RU size=2×996 which includes assigned encoding parameter values of $N_{SD}$ 1960, $N_{SD,short}$=492 when DCM is not used (e.g., DCM=0), and $N_{SD,short}$=246 when DCM is used (e.g., DCM=1).

In addition, the parameter table 500 includes gray-shaded rows which list $N_{SD}$ and $N_{SD,short}$ values for multiple resource unit MRU combinations, such as are allowed under the 802.11be standard. For example, to cover the situation where a 26 tone RU and 52 tone RU are assigned to a single user, the parameter table 500 includes an entry row for the two combined RUs having (52+26) which includes assigned encoding parameter values of $N_{SD}$=72 (which is the sum of the $N_{SD}$ values for the combined RUs), $N_{SD,short}$=18 when DCM is not used (e.g., DCM=0), and $N_{SD,short}$=8 when DCM is used (e.g., DCM=1). As seen from this row entry, the encoding parameter value for $N_{SD}$ is the sum of the $N_{SD}$ values for the combined 26 tone RU and 52 tone RU. In addition, the encoding parameter value for $N_{SD,short}$ is the sum of the $N_{SD,short}$ values for the combined 26 tone RU and 52 tone RU. In addition, to cover the situation where a 26 tone RU and 106 tone RU are assigned to a single user, the parameter table 500 includes an entry row for the two combined RUs having (106+26) which includes assigned encoding parameter values of $N_{SD}$=126, $N_{SD,short}$=30 when DCM is not used (e.g., DCM=0), and $N_{SD,short}$=14 when DCM is used (e.g., DCM=1). The parameter table 500 also covers the situation where a 484 tone RU and 242 tone RU are assigned to a single user with the entry row for the two combined RUs (484+242=726) which includes assigned encoding parameter values of $N_{SD}$=702, $N_{SD,short}$=180 when DCM is not used (e.g., DCM=0), and $N_{SD,short}$=90 when DCM is used (e.g., DCM=1). The additional MRU entries in the parameter table 500 continue until covering the situation where four 996 tone RUs are assigned to a single user with the entry row for RU Size=4×996 which includes assigned encoding parameter values of $N_{SD}$=3920, $N_{SD,short}$=984 when DCM is not used (e.g., DCM=0), and $N_{SD,short}$=492 when DCM is used (e.g., DCM=1). In gray-shaded row entry of the parameter table 500, the encoding parameter values for $N_{SD}$ and $N_{SD,short}$ are each, respectively, the sum of the $N_{SD}$ values and the $N_{SD,short}$ values for the RUs being combined and represented in that entry. As a result of this arrangement of encoding parameter values in the table 500, selected embodiments of the present disclosure do not require new $N_{SD}$, $N_{SD,short}$ tables or entries in addition to 802.11ax tables since, for cases where multiple RUs are assigned to a single user/receiver station in an OFDMA EHT PPDU, the input data processing module 411 may retrieve encoding parameter values $N_{SD}$, $N_{SD,short}$ of each component RU from the corresponding table defined in 802.11ax, and then compute the $N_{SD}$, $N_{SD,short}$ values for a multiple RU by summing up the values of each component RU, thereby saving storage space for stations operating under the 802.11be protocol. In another embodiment, the input data processing module 411 may retrieve encoding parameter values $N_{SD}$, $N_{SD,short}$ for cases where multiple RUs are assigned to a single user/receiver station in an OFDMA EHT PPDU from the new $N_{SD}$, $N_{SD,short}$ table in accordance with the 802.11be standard.

While the parameter table 500 provides one example set of encoding parameter values $N_{SD}$, $N_{SD,short}$ for aggregate MRU cases, there are other approaches for allocating encoding parameter values $N_{SD}$, $N_{SD,short}$ that are suitable for aggregate MRU cases in accordance with selected embodiments of the present disclosure. To provide another example, reference is now made to FIG. 6A which depicts a second parameter table 600A of expanded $N_{SD}$ and $N_{SD,short}$ values for use with encoding EHT data frames wherein one or more multiple resource units (MRUs) may be assigned to a single user station. Similar to the first parameter table 500, the white rows of the second parameter table 600A list the $N_{SD}$ and $N_{SD,short}$ values for each RU size specified under the 802.11ax standard for assignment to single user. In addition, the parameter table 600A includes gray-shaded rows which list $N_{SD}$ and $N_{SD,short}$ values for multiple resource unit MRU combinations. In this example, each $N_{SD,short}$ value is defined to be as close as possible to being ¼ of the corresponding $N_{SD}$ value and corresponds to an integer value for $N_{DBPS}$ for all MCS cases. In particular, the situation where a 26 tone RU and 52 tone RU are assigned to a single user is covered in the parameter table 600 with an entry row for the two combined RUs (52+26) which includes assigned encoding parameter values of $N_{SD}$=72 (which is the sum of the $N_{SD}$ values for the combined RUs), $N_{SD,short}$=18 when DCM is not used (e.g., DCM=0), and $N_{SD,short}$=8 when DCM is used (e.g., DCM=1). In addition, to cover the situation where a 26 tone RU and 106 tone RU are assigned to a single user, the parameter table 600 includes an entry row for the two combined RUs having 106+26 which includes assigned encoding parameter values of $N_{SD}$=126, $N_{SD,short}$=30 when DCM is not used (e.g., DCM=0), and $N_{SD,short}$=16 when DCM is used (e.g., DCM=1). The parameter table 600 also covers the situation where a 484 tone RU and 242 tone RU are assigned to a single user with the entry row for the two combined RUs (484+242) which includes assigned encoding parameter values of $N_{SD}$=702, $N_{SD,short}$=174 when DCM is not used (e.g., DCM=0), and $N_{SD,short}$=88 when DCM is used (e.g., DCM=1). The additional MRU entries in the parameter table 600 continue until reaching the situation where four 996 tone RUs are assigned to a single user with the entry row for RU Size=4×996 which includes assigned encoding parameter values of $N_{SD}$=3920, $N_{SD,short}$=978 when DCM is not used (e.g., DCM=0), and $N_{SD,short}$=490 when DCM is used (e.g., DCM=1). In each row entry of the parameter table 600, the encoding parameter values for $N_{SD}$ are the sum of the $N_{SD}$ values for the RUs being combined and represented in that entry. However, this additive relationship does not hold for the $N_{SD,short}$ values. Instead, each $N_{SD,short}$ (DCM=0) value is defined to be as close as possible to the value ¼ $N_{SD}$ while maintaining an integer value for $N_{DBPS}$ for all MCSs. As a result of this arrangement of encoding parameter values in the table 600, the input data processing module 411 may retrieve encoding parameter values $N_{SD}$, $N_{SD,short}$ for cases where multiple RUs are assigned to a single user/receiver station in an OFDMA EHT PPDU.

To provide another example set of encoding parameter values $N_{SD}$, $N_{SD,short}$ for aggregate MRU cases, reference is now made to FIG. 6B which depicts a third parameter table 600B of expanded $N_{SD}$ and $N_{SD,short}$ values for use with encoding EHT data frames wherein one or more multiple resource units (MRUs) may be assigned to a single user station. Again, the white rows of the third parameter table 600B list the $N_{SD}$ and $N_{SD,short}$ values for each RU size specified under the 802.11ax standard for assignment to single user. In addition, the parameter table 600B includes gray-shaded rows which list $N_{SD}$ and $N_{SD,short}$ values for multiple resource unit MRU combinations. In this example, $N_{SD,short}$ values are defined to be as close as possible to being ¼ of the corresponding $N_{SD}$ value and the corresponding $N_{DBPS}$ is an integer value for all MCSs, and the $N_{SD,short}$ values for large RUs (e.g., RUs≥106 tones) also satisfy the requirement that the $N_{SD,short}$ (DCM=0)=2×$N_{SD,short}$ (DCM=1). In particular, the smaller RU combination of a 26 tone RU and 52 tone RU is covered in the parameter table 600 with an entry row for the two combined RUs (52+26) which includes assigned encoding parameter values of $N_{SD}$=72 (which is the sum of the $N_{SD}$ values for the combined RUs), $N_{SD,short}$=18 when DCM is not used (e.g., DCM=0), and $N_{SD,short}$=8 when DCM is used (e.g., DCM=1). However, the larger RU combination of a 26 tone RU and 106 tone RU being assigned to a single user is covered in the parameter table 600 with an entry row for the two combined RUs (106+26) which includes assigned encoding parameter values of $N_{SD}$=126, $N_{SD,short}$=36 when DCM is not used (e.g., DCM=0), and $N_{SD,short}$=18 when DCM is used (e.g., DCM=1). The parameter table 600 also covers the situation where a 484 tone RU and 242 tone RU are assigned to a single user with the entry row for the two combined RUs (484+242) which includes assigned encoding parameter values of $N_{SD}$=702, $N_{SD,short}$=180 when DCM is not used (e.g., DCM=0), and $N_{SD,short}$=90 when DCM is used (e.g., DCM=1). The additional MRU entries in the parameter table 600 continue until reaching the situation where four 996 tone RUs are assigned to a single user with the entry row for RU Size=4×996 which includes assigned encoding parameter values of $N_{SD}$=3920, $N_{SD,short}$=984 when DCM is not used (e.g., DCM=0), and $N_{SD,short}$=492 when DCM is used (e.g., DCM=1). In each row entry of the parameter table 600, the encoding parameter values for $N_{SD}$ are the sum of the $N_{SD}$ values for the RUs being combined and represented in that entry. However, this additive relationship does not hold for the $N_{SD,short}$ values. Instead, each $N_{SD,short}$(DCM=0) value is defined to be as close as possible to the value ¼ $N_{SD}$, the corresponding $N_{DBPS}$ is an integer value for all MCSs, and each $N_{SD,short}$ value for large RUs (e.g., RUs≥106 tones) are defined so that the $N_{SD,short}$ (DCM=0)=2×$N_{SD,short}$ (DCM=1). As a result of this arrangement of encoding parameter values in the table 600, the input data processing module 411 may retrieve encoding parameter values $N_{SD}$, $N_{SD,short}$ for cases where multiple RUs are assigned to a single user/receiver station in an OFDMA EHT PPDU.

Figure 7:
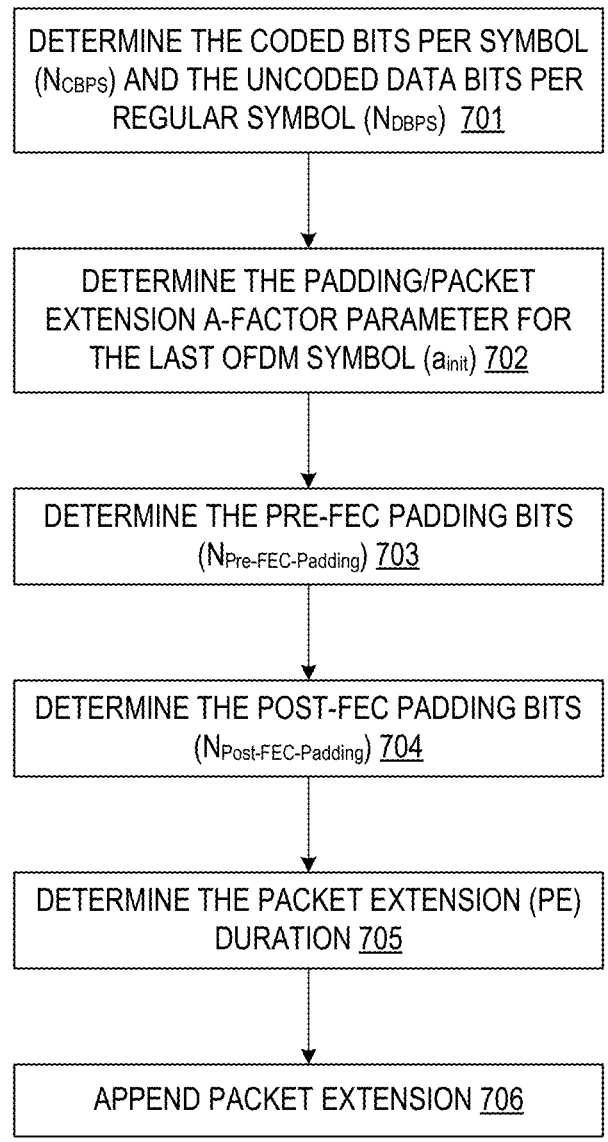
FIG. 7 depicts an exemplary logic flow diagram illustrating a padding and packet extension procedure implemented with an EHT encoder in accordance with selected embodiments of the present disclosure.

To provide additional details for an improved understanding of selected embodiments of the present disclosure, reference is now made to FIG. 7 which depicts an exemplary logic flow diagram 700 to illustrate the operation of a wireless communication station (STA) device which uses an EHT encoder to implement a padding and packet extension procedure. At 701, an encoder may determine the number of coded bits and uncoded data bits per symbol for regular symbol and short symbol. For example, the encoder may determine the coded bits per symbol ($N_{CBPS}$) for a user u based on the computation of $N_{CBPS(u)}=N_{SD(u)} \times N_{SS(u)} \times N_{BPSCS(u)}$, where $N_{CBPS(u)}$ denotes the number of coded bits per symbol in a 4× symbol for user u, where $N_{SD(u)}$ denotes the number of scheduled data subcarriers in a 4× symbol for user u, where Nss(u) denotes the number of special strings in a 4× symbol for user u, and where $N_{BPSCS(u)}$ denotes the number of coded bits per subcarrier per spatial streams in a 4× symbol for user u, u=0, 1, 2, 3, etc. The encoder may also determine the uncoded data bits per symbol ($N_{DBPS}$) based on the computation $N_{DBPS(u)}=N_{CBPS(u)} \times R_{(u)}$, where $N_{DBPS(u)}$ denotes the number of data bits per symbol in a 4× symbol for user u, and where R denotes the coding rate for user u. Similarly, the encoder may determine the coded bits per symbol for short symbol ($N_{CBPS,short}$) as $N_{CBPS,short(u)}=N_{SD,short(u)} \times N_{SS(u)} \times N_{BPSCS(u)}$ and the uncoded data bits per symbol for short symbol ($N_{DBPS,short}$) as $N_{DBPS,short(u)}=N_{CBPS,short(u)} \times R_{(u)}$. It is noted that for all the defined parameters, the values can be configured differently for a specific user u, and the subscript "u" may be adopted or skipped interchangeably throughout the disclosure. Specifically, when single user (SU) or multi-user (MU) multiple-input multiple-output (MIMO) system with physical protocol data unit (PPDU) is employed, $N_{SD}$ denotes the number of available data subcarriers.

At 702, the encoder may start a pre-FEC padding procedure by determining a padding or packet extension a-factor parameter ($a_{init}$) for the last OFDM symbol (i.e., a short symbol) based on the equation from the 802.11ax standard:

$$a_{init} = \begin{cases} 4, & \text{if } N_{Excess} = 0 \\ \min\left(\left\lceil \dfrac{N_{Excess}}{m_{STBC} \cdot N_{DBPS,short}} \right\rceil, 4\right), & \text{otherwise} \end{cases}$$

where the excess information bits $N_{EXCESS}$=mod(8× APEP_LENGTH+$N_{Tail}$+$N_{service}$, $m_{STBC} \times N_{DBSP}$), where $N_{DBPS,short}=N_{CBPS,short} \times R$, and where $m_{STBC}$ is a space time block coding factor. However, instead of making the computation using the padding parameters $N_{SD}$, $N_{SD,short}$, $N_{DBPS}$ and $N_{DBPS,short}$ defined in the 802.11be standard, the computation performed at step 702 uses updated $N_{SD}$, $N_{SD,short}$, $N_{DBPS}$ and $N_{DBPS,short}$ parameters which are defined to allow MRUs to be assigned to a single user/receiver station, such as set forth by way of example in FIGS. 5-6. To support assignment of MRUs to one user for full-bandwidth puncture and OFDMA cases, the updated $N_{SD}$ and $N_{SD,short}$ parameters may be defined to include allowed $N_{SD}$ and $N_{SD,short}$ parameters from the 802.11ax standard, and to also include new $N_{SD}$ and $N_{SD,short}$ parameters for RU combinations of allowed RU sizes from the 802.11 ax standard, where each new $N_{SD}$ and $N_{SD,short}$ parameter is defined as the sum of the allowed $N_{SD}$ and $N_{SD,short}$ parameters from the 802.11ax standard for the allowed RUs being combined.

In selected embodiments, the a-factor computation at step 702 may flexibly compute or choose an updated a-factor to be larger or equal to the minimum a-factor ($a_{min}$) required by the receiving station. In such embodiments, the encoder is configured to compute an updated initial a-factor $a_{init\_upd}$=max($a_{init}$, $a_{min}$), where $a_{min}$ is the minimum a-factor that the receiving station requires. In this way, the initial a-factor $a_{init}$ can be adjusted based on the updated initial a-factor $a_{init\_upd}$ as $a_{init}=a_{init\_upd}$ or $a_{init} \geq a_{init\_upd}$. By flexibly adjusting the a-factor in response to the receiver station indicating its minimum a-factor requirement, the encoder may subsequently provide a larger packet extension field for one OFDM symbol PPDU data packets using 320 MHz and/or large $N_{SS}$ signaling.

At 703, the encoder determines the pre-FEC padding bits. For example, the number of data bits of the last symbol can be computed as $N_{DBPS,last}=a_{init} \times N_{DBPS,short}$. In addition, the number of padding bits can computed as $N_{Pre-FEC-Padding}=N_{DBPS,last}-N_{Excess}$. The pre-FEC padding bits are appended to align the coded excess information bits $N_{EXCESS}$ to one of four padding boundaries which correspond to the computed a-factor, and then FEC encoding is performed to generate FEC output bits.

At 704, the encoder determines the post-FEC padding bits for the last OFDM symbol. For example, for a non-short padding scenario (e.g., when the a-factor $a_{init}$=4), the last symbol can be modulated in the same way as a regular long symbol. However, with a short padding scenario (e.g., when the a-factor $a_{init}$=1, 2 or 3), the computed post-FEC padding bits are added to the FEC output bits to fill up the last symbol before modulating the PPDU data packet for transmission.

At 705, the encoder determines the duration of the packet extension (PE) for the PPDU data packet which will be used to extend the PPDU energy over a longer duration of time to allow the receiver station to process the coded information in the PPDU packet within the required time frame for responding to the transmitting station. In selected embodiments, the computation of the PE duration may be based at least in part on the a-factor computed at step 702 and a nominal maximum nominal packet extension value. For example, for a non-short padding scenario (e.g., when the a-factor $a_{init}$=4), the number of PE bits (or PE field duration) may be computed as the nominal maximum nominal packet extension value. However, with a short padding scenario (e.g., when the a-factor $a_{init}$=1, 2 or 3), the number of PE bits may be computed by scaling down or reducing the duration of the nominal maximum nominal packet extension value.

In accordance with the present disclosure, there are a variety of embodiments for determining the number of PE bits (or PE field duration) at step 705. In a first example embodiment of the computation at step 705, the nominal maximum nominal packet extension value is set to a first value (e.g., 16 μs) that is consistent with the 802.11ax standard. However, instead of simply computing the number of PE bits based on the initial a-factor ($a_{init}$) specified in the 802.11 ax standard, the encoder may use the updated initial a-factor $a_{init\_upd}$ which, as described hereinabove, is computed to be larger or equal to the minimum a-factor ($a_{min}$) required by the receiving station. In this way, a flexible padding a-factor is computed which allows the encoder to compute a larger number of PE bits or PE field duration than would be generated if the PE bit computation was based on the initial a-factor ($a_{init}$).

In a second example embodiment of the computation at step 705, the nominal maximum nominal packet extension value is set to a second, larger maximum nominal packet extension value (e.g., 20 μs) which the maximum value that can be signaled by the encoder with a single PE ambiguity bit. In this example, the number of PE bits for a non-short padding scenario (e.g., when the a-factor $a_{init}$=4) would be computed as 20 μs, and the number of PE bits computed for the short padding scenarios $a_{init}$=1, 2 or 3 would be computed, respectively, as 8 μs, 12 μs, and 16 μs. In selected embodiments, the second, larger maximum nominal packet extension value may be increased (e.g., up to 28 μs) with increases in the guard interval duration which are chosen by the encoder based on the receiver's PE capability and the computed a-factor. In this case, the number of PE bits for the short padding scenarios would be increased by correspondingly amounts.

In a third example embodiment of the computation at step 705, the nominal maximum nominal packet extension value is set to a third, larger maximum nominal packet extension value (e.g., up to 40 μs) which is signaled by the encoder with two ambiguity bits. For example, for a non-short padding scenario (e.g., when the a-factor $a_{init}$=4), the number of PE bits may be computed as 40 μs, and the number of PE bits computed for the short padding scenarios $a_{init}$=1, 2 or 3 could be computed, respectively, as 28 μs, 32 μs, and 36 μs. If desired, the third, larger maximum nominal packet extension value could be set to a smaller value (e.g., 28 μs), in which case the number of PE bits for the non-short padding scenario would be set to 28 μs, and the number of PE bits computed for the short padding scenarios $a_{init}$=1, 2 or 3 would be computed, respectively, as 16 μs, 20 μs, and 24 μs.

At 706, the encoder appends the packet extension (PE) to the data field of the PPDU data packet before or after performing OFDM modulation.

Figure 8:
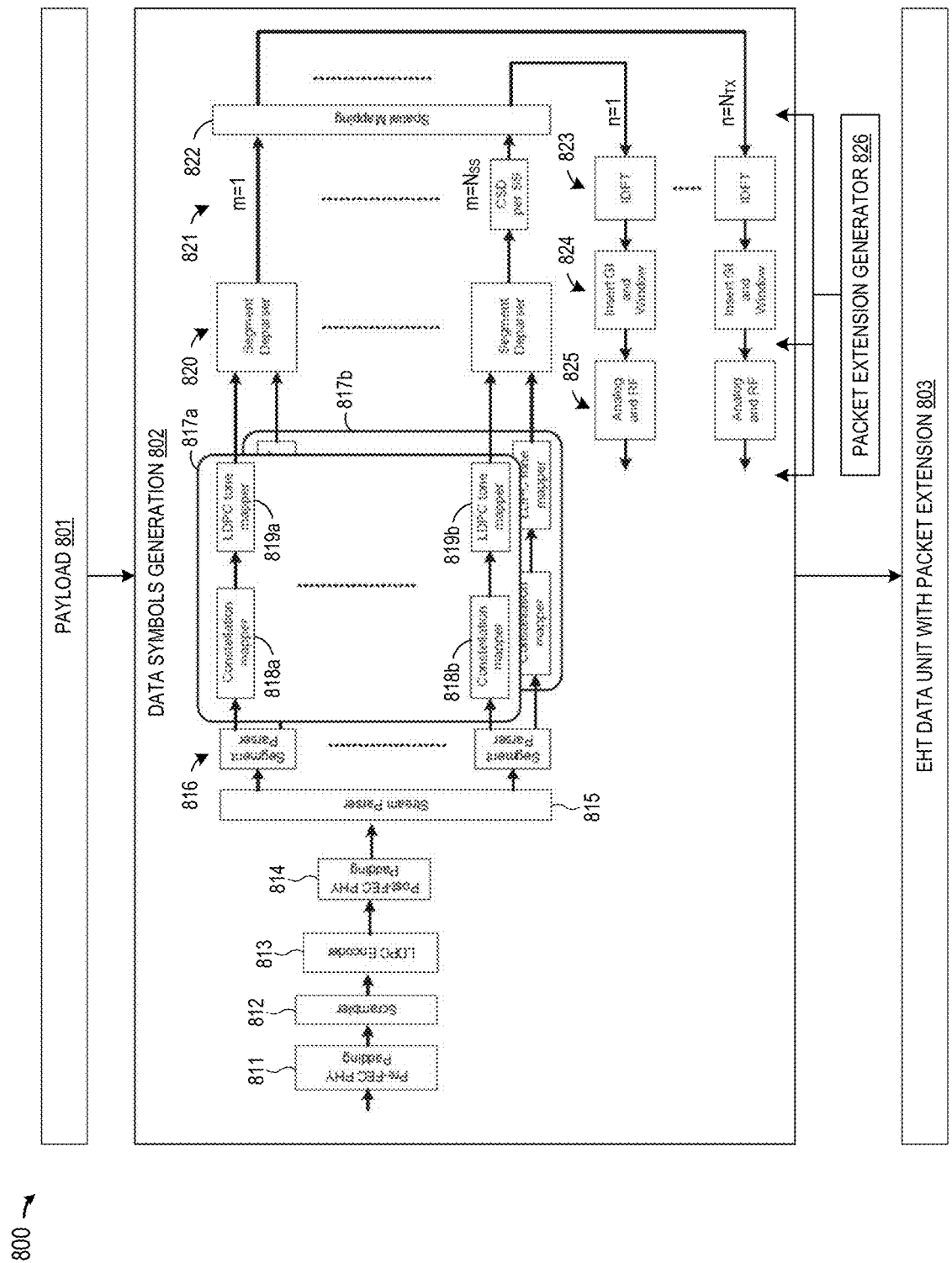
FIG. 8 depicts a simplified transmitter block diagram of a PHY processing unit used to generate a data field of an EHT user in accordance with selected embodiments of the present disclosure.

To provide additional details for an improved understanding of selected embodiments of the present disclosure, reference is now made to FIG. 8 which depicts a simplified transmitter block diagram of a PHY processing unit 800 which includes a data symbols generation unit 802 that is connected to receive payload data 801 and to generate an EHT data unit with a packet extension field 803. The depicted PHY processing unit 802 is configured to generate data units such as the EHT PHY data unit 200 of FIG. 2, though other suitable data units having different formats and field formats can be used. As depicted, the PHY processing unit 800 includes a processing path 811-822 in the data symbols generation unit 802 which includes a pre-FEC PHY padding unit 811, a scrambler 812, one or more LDPC or FEC encoders 813, a post-FEC PHY padding unit 814, a stream parser 815, segment parsers 816, constellation mappers 818a-b, LDPC tone mappers 819a-b, segment deparsers 820, cyclic shift diversity (CSD) per spatial stream units 821 and a spatial mapping unit 822. As will be appreciated that, in some embodiments, some of the components of the processing path 811-822 may be bypassed or omitted or other components may be added or substituted. Further, it will be appreciated that in embodiments where PHY processing unit 800 is configured to generate multi-user data units, there may be multiple parallel processing paths, with each path corresponds to a particular client station, to which the multi-user data unit is to be transmitted.

As described hereinabove, the pre-FEC PHY padding unit 811 adds one or more padding bits to an information bit stream by performing the computation described herein for using updated $N_{SD}$, $N_{SD,short}$, $N_{DBPS}$ and $N_{DBPS,short}$ parameters which are defined to allow MRUs to be assigned to a single user/receiver station, such as set forth by way of example in FIGS. 5-6. The padded information bit stream generated by the padding unit 811 is provided to the scrambler 812 which generally scrambles the information bit stream to reduce occurrences of long sequences of ones or zeros. The scrambled (padded) information bit stream is provided to the LDPC encoder 813 which performs forward error correction encoding, thereby generating FEC encoded bits for output to the post-FEC PHY padding unit 814. While a single FEC encoder 813 is shown, additional FEC encoders may be used. While an LDPC encoder is shown, the FEC encoder 813 may be a binary convolutional coder (BCC).

In addition, the post-FEC PHY padding unit 814 adds one or more padding bits to the FEC encoded bits prior to providing the information bit stream to the stream parser 815 which parses the one or more encoded streams into $N_{SS}$ spatial streams for separate interleaving and mapping into constellation points/symbols. In one embodiment, the stream parser 815 operates according to the IEEE 802.11be standard. Each of the Nss spatial streams is provided to a corresponding segment parser 816 which parses the coded bits into multiple segments. In an embodiment, each segment parser 816 parses coded bits at an output of the stream parser 815 into a plurality of segments corresponding to a plurality of frequency sub-bands of the communication channel for which the data unit is being generated. With reference to an example 40 MHz wide communication channel, each segment parser 816 parses coded bits at an output of the stream parser 815 to two segments corresponding to two 20 MHz frequency sub-bands of the 40 MHz channel. While each segment parser 816 is shown as a two segment parser having two outputs, it will be appreciated that each segment parser 816 may parse coded bits into a number of segments greater than two.

Coded bits corresponding to each spatial stream and each segment are operated on by a respective constellation mapper 818a-818b, each of which maps a sequence of bits to constellation points corresponding to different subcarriers/tones of an OFDM symbol. In selected embodiments, for each spatial stream and each segment, a constellation mapper 818 translates every bit sequence of length $\log_2(M)$ into one of M constellation points. The constellation mapper 818 handles different numbers of constellation points depending on the MCS being utilized. In selected embodiments, the constellation mapper 818 is a quadrature amplitude modulation (QAM) mapper that handles different modulation schemes corresponding to one or more of M=2, 4, 16, 64, 256, 1024, and 4096.

Each LDPC tone mapper 819a, 819b reorders constellation points corresponding to a spatial stream and a segment according to a tone remapping function which functionally maps consecutive coded bits or blocks of information bits onto nonconsecutive tones in the OFDM symbol to facilitate data recovery at the receiver in cases in which consecutive OFDM tones are adversely affected during transmission.

Outputs of LDPC tone mappers 819 corresponding to respective spatial stream are provided to respective segment deparsers 820. Each segment deparser 820 merges the outputs of the LDPC tone mappers 819 corresponding to a spatial stream. In addition, cyclic shift diversity (CSD) units 821 may be coupled to the segment deparsers 820. The CSD units 821 insert cyclic shifts into outputs from all but one of the segment deparsers 820 (if more than one space-time stream) to prevent unintentional beamforming.

The spatial mapping unit 822 maps the $N_{SS}$ spatial streams to $N_{TX}$ transmit chains. In various embodiments, spatial mapping may include 1) direct mapping, in which constellation points from each space-time stream are mapped directly onto transmit chains (i.e., one-to-one mapping); 2) spatial expansion, in which vectors of constellation points from all space-time streams are expanded via matrix multiplication to produce inputs to the transmit chains; and/or 3) beamforming, in which each vector of constellation points from all of the space-time streams is multiplied by a matrix of steering vectors to produce inputs to the transmit chains. Each output of the spatial mapping unit 822 corresponds to a transmit chain, and each output of the spatial mapping unit 822 is operated on by an IDFT calculation unit 823 (e.g., an inverse fast Fourier transform (IFFT) calculation unit) that converts a block of constellation points to a time-domain signal. In an embodiment in which the PHY processing unit 800 includes multiple processing paths 811-822 corresponding to multiple receivers of an OFDMA data unit, each IDFT calculation unit 823 includes multiple inputs corresponding to outputs of the multiple processing paths 811-822. In such embodiments, each IDFT calculation unit 823 jointly performs IDFT for all of the receivers on the OFDMA data unit.

Outputs of the IDFT units 823 are provided to GI insertion and windowing units 824 that prepend, to OFDM symbols, a guard interval (GI) portion which is a circular extension of an OFDM symbol in an embodiment, and smooth the edges of OFDM symbols to increase spectral delay. Outputs of the GI insertion and windowing units 824 are provided to analog and radio frequency (RF) units 825 that convert the signals to analog signals and upconvert the signals to RF frequencies for transmission. The signals are transmitted in a 20 MHz, a 40 MHz, an 80 MHz, a 160 MHz, or a 320 MHz bandwidth channel, though other suitable channel bandwidths may be used.

In the PHY processing unit 800, the disclosed data symbols generation unit 802 illustrates an example arrangement of transmitter blocks 811-825 which process the payload 801 to generate the data payload for an EHT data unit in accordance with selected embodiments of the present disclosure. In addition, the PHY processing unit 800 may include a packet extension field generator 826 that is connected and configured to append a PE field to the last data symbol. As depicted, the packet extension field generator 826 may be implemented by adding dummy frequency-domain digital bits before the IDFT calculation units 823, by adding dummy time-domain digital samples after the GI insertion and windowing units 824, or add dummy analog signals after the analog and RF units 825.

In selected embodiments, a PE field is attached to data units conforming to all or some transmission modes (e.g., all channel bandwidths and all modulation and coding schemes) defined by the EHT communication protocol. In addition, the length and duration of the PE fields may be determined at the transmitting station based on encoding parameters defined by the EHT communication protocol. In selected embodiments, the transmitting station may use the computed packet padding a-factor ($a_{init}$) to determine the duration of the PE field on the basis of a nominal packet extension value nominalPE and a decrement value D (e.g., 4 μs). For example, the transmitting station may compute the duration of the PE field with the following values:

| PE Field Duration |
| --- |
| nominalPE when $a_{init}$ = 4 |
| nominalPE − D when $a_{init}$ = 3 |
| nominalPE − 2D when $a_{init}$ = 2 |
| nominalPE − 3D when $a_{init}$ = 1 |

As will be appreciated, any suitable values may be used for the nominal packet extension value nominalPE and decrement value D. For example, when the nominal packet extension value nominalPE=16 μs and the decrement value D=4 μs, then the PE field duration values conform to the 802.11ax standard. In certain 802.11be data transmission cases (e.g., 320 MHz and/or large Nss) where the 802.11 ax PE field duration values are not sufficient for the receiving station to timely return a response message (e.g., ACK), the packet extension field generator unit 826 can compute a longer duration PE field without changing the nominal packet extension value nominalPE. In such embodiments, the packet extension field generator unit 826 is configured to compute a longer duration PE field for small a-factor cases and for PPDU with only one data symbol by choosing a larger a-factor to be larger or equal than the minimum a-factor required by the receiving station.

In other embodiments, the packet extension field generator 826 can be configured to use a second, larger maximum nominal packet extension value PEmax (e.g., 20 μs) which is signaled by the transmitter with a single ambiguity bit. In selected embodiments where only one PE ambiguity bit is used, the second, larger maximum nominal packet extension value may be increased (e.g., up to 28 μs) with increases in the guard interval duration which are chosen by the transmitter station based on the receiver station's PE capability and the computed a-factor. For example, if the receiving station's maximum PE capability=24 μs, then the packet extension field generator 826 can set maximum nominal packet extension to 24 μs for any GI setting where the a-factor is smaller than 4. In addition, if the receiving station's maximum PE capability=24 μs, then the packet extension field generator 826 can set maximum nominal packet extension to 24 μs for any GI setting larger than 0.8 μs where the a-factor=4. In addition, if the receiving station's maximum PE capability=28 μs, then the packet extension field generator 826 can set maximum nominal packet extension to 28 μs for any GI setting where the a-factor is smaller than 3. And if the receiving station's maximum PE capability=28 μs, then the packet extension field generator 826 can set maximum nominal packet extension to 28 μs for any GI setting larger than 0.8 μs where the a-factor=3. Finally, if the receiving station's maximum PE capability=28 μs, then the packet extension field generator 826 can set maximum nominal packet extension to 28 μs for any GI setting larger than 1.6 μs where the a-factor=4.

In yet other selected embodiments, the packet extension field generator 826 can be configured to use a third, larger maximum nominal packet extension value PEmax (e.g., up to 40 μs) which is signaled by the transmitter with two ambiguity bits. With this approach of using two PE ambiguity bits, the packet extension field generator 826 can set the maximum nominal packet extension value for the PE field to any value between 28 μs and 40 μs, in which case the durations of the packet extension values for smaller computed a-factor values ($a_{init}$=3, 2, 1) may be set, respectively, at diminishing D intervals from the larger nominal packet extension value.

By now it should be appreciated that there has been provided an apparatus, method, and system for generating a data unit at a first station (STA) device for transmission to a second STA device in a wireless area network in accordance with a communication protocol, such as the IEEE 802.11be protocol, which allows multiple resource units to be assigned to a single user. As disclosed, the method determines a number of information bits $N_{EXCESS}$ that are available for inclusion in a last symbol of a plurality of data symbols. In addition, the method processes a plurality of encoding parameters—including a first encoding parameter $N_{SD}$ specifying a number of data tones in a full symbol and a second encoding parameter $N_{SD,short}$ specifying a number of data tones that is approximately one-fourth of the number of data tones in a full symbol—to select a padding boundary from a plurality of pre-defined padding boundaries in the last symbol that will most closely include the number of information bits $N_{EXCESS}$ in the last symbol. In selected embodiments, the encoding parameters are processed by retrieving the first encoding parameter $N_{SD}$ from a table, such as shown in FIG. 5, which includes (1) a first plurality of $N_{SD}$ values for a first set of resource unit sizes, and (2) a second plurality of $N_{SD}$ values for aggregated resource unit sizes, each of which is a sum of at least two $N_{SD}$ values from the first plurality of $N_{SD}$ values. In other embodiments, the encoding parameters are processed by retrieving the second encoding parameter $N_{SD,short}$ from a table, such as shown in FIG. 5, which includes (1) a first plurality of $N_{SD,short}$ values for resource unit sizes, and (2) a second plurality of $N_{SD,short}$ values for aggregated resource unit sizes, each of which is a sum of at least two $N_{SD,short}$ values from the first plurality of $N_{SD,short}$ values. As disclosed, the first encoding parameter $N_{SD}$ is specified for an aggregated resource unit size that is allowed as a sum of $N_{SD}$ values for at least two other resource units. The method also appends a first number of padding bits to the number of information bits $N_{EXCESS}$ to fill up to the selected padding boundary in the last symbol, thereby generating pre-encoded data bits. In addition, the method encodes the pre-encoded data bits to generate encoded output bits for data transmission, and appends a second number of padding bits to the encoded output bits to fill up the last symbol. In selected embodiments, the method also includes determining a duration of a packet extension field that follows the last symbol based on the selected padding boundary and a nominal packet extension value that is longer than 16 μs and that requires only one packet extension ambiguity signaling bit, and then appending the packet extension field following the last symbol. In selected embodiments, the nominal packet extension value is less than or equal to 20 μs for any guard interval duration used to transmit the data unit. In other embodiments, the nominal packet extension value is less than or equal to 24 μs for a guard interval duration of 1.6 μs used to transmit the data unit. In other embodiments, the nominal packet extension value is less than or equal to 28 μs for a guard interval duration of 3.2 μs used to transmit the data unit. In selected embodiments, the method also includes determining a duration of a packet extension field that follows the last symbol based on the selected padding boundary and a maximum nominal packet extension value that is between 28-40 μs and that requires only two packet extension ambiguity signaling bits, and the appending the packet extension field following the last symbol.

In another form, there has been provided an apparatus, method, and system for generating a data unit at a first station (STA) device for transmission to a second STA device in a wireless area network in accordance with a communication protocol which allows multiple resource units to be assigned to a single user and/or supports transmission bandwidth more than 160 MHz and/or more than 8 spatial streams and/or. As disclosed, the method determines a number of information bits $N_{EXCESS}$ that are available for inclusion in a last symbol of a plurality of data symbols. In addition, the method processes a plurality of encoding parameters—including a first encoding parameter $N_{SD}$ specifying a number of data tones in a full symbol and a second encoding parameter $N_{SD,short}$ specifying a number of data tones that is approximately one-fourth of the number of data tones in a full symbol—to select a padding boundary from a plurality of pre-defined padding boundaries in the last symbol that will most closely include the number of information bits $N_{EXCESS}$ in the last symbol. In selected embodiments, the first encoding parameter $N_{SD}$ is specified for an aggregated resource unit size that is allowed as a sum of $N_{SD}$ values for at two other resource units. In other embodiments, the encoding parameters are processed by retrieving the first encoding parameter $N_{SD}$ from a table, such as shown in FIG. 5, which includes (1) a first plurality of $N_{SD}$ values for a first set of resource unit sizes, and (2) a second plurality of $N_{SD}$ values for aggregated resource unit sizes, each of which is a sum of at least two $N_{SD}$ values from the first plurality of $N_{SD}$ values. In other embodiments, the encoding parameters are processed by retrieving the second encoding parameter $N_{SD,short}$ from a table, such as shown in FIG. 5, which includes (1) a first plurality of $N_{SD,short}$ values for resource unit sizes, and (2) a second plurality of $N_{SD,short}$ values for aggregated resource unit sizes, each of which is a sum of at least two $N_{SD,short}$ values from the first plurality of $N_{SD,short}$ values. The method also appends a first number of padding bits to information bits to fill up to the selected padding boundary in the last symbol, thereby generating pre-encoded data bits. In addition, the method encodes the pre-encoded data bits to generate encoded output bits for data transmission, and appends a second number of padding bits to the encoded output bits to fill up the last symbol. The disclosed method also determines a duration of a packet extension field that follows the last symbol based on the selected padding boundary and a maximum nominal packet extension value that is longer than 16 μs, and then appends the packet extension field following the last symbol. In selected embodiments, the maximum nominal packet extension value is less than or equal to 20 μs for any guard interval duration used to transmit the data unit and requires only one packet extension ambiguity signaling bit. In other embodiments, the maximum nominal packet extension value is less than or equal to 24 μs for a guard interval duration of 1.6 μs used to transmit the data unit and requires only one packet extension ambiguity signaling bit. In other embodiments, the maximum nominal packet extension value is less than or equal to 28 μs for a guard interval duration of 3.2 μs used to transmit the data unit and requires only one packet extension ambiguity signaling bit. In other embodiments, the maximum nominal packet extension value is between 28-40 μs and requires only two packet extension ambiguity signaling bits.

In yet another form, there is provided a method and apparatus for transmitting orthogonal frequency division multiplexing (OFDM) symbols for a data unit in a wireless personal area network in accordance with IEEE 802.11be protocol. As disclosed, the apparatus includes a transceiver to exchange data with a wireless device, a processor, and a memory storing instructions. When executed by the processor, the instructions cause the apparatus to determine a number of information bits $N_{EXCESS}$ that are available for inclusion in a last symbol of a plurality of OFDM data symbols. In addition, the executed instructions cause the processor to select a padding boundary from a plurality of pre-defined padding boundaries in the last OFDM symbol that will most closely include the number of information bits $N_{EXCESS}$ in the last OFDM symbol by processing a plurality of encoding parameters, comprising a first encoding parameter $N_{SD}$ specifying a number of data tones in a full OFDM symbol and a second encoding parameter $N_{SD,short}$ specifying a number of data tones that is approximately one-fourth of the number of data tones in a OFDM full symbol, where at least the first encoding parameter $N_{SD}$ is specified for an aggregated resource unit size that is allowed as a sum of $N_{SD}$ values for at two other resource units. The executed instructions also cause the processor to append a first number of padding bits to the number of information bits $N_{EXCESS}$ to fill up the selected padding boundary in the last OFDM symbol, thereby generating pre-encoded data bits. In addition, the executed instructions cause the processor to encode the pre-encoded data bits to generate encoded output bits for data transmission, and to append a second number of padding bits to the encoded output bits to fill up the last OFDM symbol. The executed instructions also cause the processor to determine a duration of a packet extension field that follows the last OFDM symbol based on the selected padding boundary and a nominal packet extension value that is longer than 16 μs and that requires only one packet extension ambiguity signaling bit. Finally, the executed instructions also cause the processor append the packet extension field following the last OFDM symbol.

In still yet another form, there has been provided an apparatus, method, and system for operating a receiving station in a wireless area network to receive and process a packet in accordance with a communication protocol, such as the IEEE 802.11be protocol, which allows multiple resource units to be assigned to a single user. In the disclosed method, the receiving station receives, via a wireless channel, a packet which includes one or more preamble OFDM symbols and one or more data field OFDM symbols. In addition, the receiving station decodes the one or more preamble OFDM symbols to extract an a-factor (e.g., $a_{init}$), a packet length parameter (e.g., LENGTH), data modulation parameters (e.g., Nss, MCS, RU/MRU configuration, LTF and GI setting, BW, Puncture information), and at least a first packet extension ambiguity bit (e.g., PE disambiguity bit) for the packet. The receiving station also calculates the number of symbols (e.g., Nsym) in the data field portion and a duration of a packet extension field (e.g., $T_{PE}$) from a first subset of the data modulation parameters (e.g., Nss, RU/MRU configuration, LTF and GI setting), the packet extension ambiguity bit (e.g., PE disambiguity bit) and the packet length parameter (e.g., LENGTH), where the packet extension field is longer than 16 μs and requires only one packet extension ambiguity signaling bit to be decoded from the one or more preamble OFDM symbols. In addition, the receiving station processes a resource unit allocation parameter (e.g., BW and Puncture information (for non-OFDMA mode) or RU/MRU configuration (for OFDMA mode)) from the data modulation parameters to identify a first decoding parameter value (e.g., $N_{SD}$) specifying a number of data tones in a full symbol and a second decoding parameter value (e.g., $N_{SD,short}$) specifying a number of data tones that is approximately one-fourth of the number of data tones in a full symbol, where at least the first decoding parameter value ($N_{SD}$) is specified for an aggregated resource unit size that is allowed as a sum of decoding parameter values $N_{SD}$ for at least two other resource units assigned to the receiving station. The receiving station also determines data decoding parameters (e.g., $N_{DBPS}$, $N_{DBPS,short}$, $N_{CBPS}$, $N_{CBPS,short}$) based on a second subset of the data modulation parameters (MCS, Nss), the first decoding parameter value ($N_{SD}$), the second decoding parameter value ($N_{SD,short}$), and the a-factor (e.g., pre-FEC "a" factor) which identifies a boundary for a last modulated data subcarrier from a plurality of pre-defined padding boundaries in a last symbol from the data field portion. Based on the data decoding parameters, the receiving station decodes the data field portion to extract data from a plurality of resource units assigned to the receiving station.

Although the described exemplary embodiments disclosed herein are directed to a wireless communication station (STA) devices which use MCS operation parameters to compute packet padding and extension bits in selected 802.11be-compliant wireless connectivity applications and methods for operating same, the present invention is not necessarily limited to the example embodiments which illustrate inventive aspects of the present invention that are applicable to a wide variety of circuit designs and operations. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the identification of the circuit design and configurations provided herein is merely by way of illustration and not limitation and other circuit arrangements and MCS operational parameters may be used in order to configure wireless communication devices with packet padding and extension bits. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts. When implemented in hardware, the hardware may comprise one or more of discrete components, an integrated circuit, an application-specific integrated circuit (ASIC), a programmable logic device (PLD), etc.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for generating a data unit at a first station (STA) device for transmission to a second STA device in a wireless area network in accordance with a communication protocol which allows multiple resource units to be assigned to a single user, comprising:
    determining a number of information bits $N_{EXCESS}$ that are available for inclusion in a last symbol of a plurality of data symbols;
    processing a plurality of encoding parameters, comprising a first encoding parameter $N_{SD}$ specifying a number of data tones in a full symbol and a second encoding parameter $N_{SD,short}$ specifying a number of data tones that is approximately one-fourth of the number of data tones in a full symbol, to select a padding boundary from a plurality of pre-defined padding boundaries in the last symbol that will most closely include the number of information bits $N_{EXCESS}$ in the last symbol;
    appending a first number of padding bits to the number of information bits $N_{EXCESS}$ to fill up to the selected padding boundary in the last symbol, thereby generating pre-encoded data bits;
    encoding, for data transmission, the pre-encoded data bits to generate encoded output bits; and
    appending a second number of padding bits to the encoded output bits to fill up the last symbol,
    where at least the first encoding parameter $N_{SD}$ is specified for an aggregated resource unit size that is allowed as a sum of $N_{SD}$ values for at least two other resource units.

2. The method of claim 1, where processing the plurality of encoding parameters comprises retrieving the first encoding parameter $N_{SD}$ from a table comprising:
    a first plurality of $N_{SD}$ values for a first set of resource unit sizes; and
    a second plurality of $N_{SD}$ values for aggregated resource unit sizes, each of which is a sum of at least two $N_{SD}$ values from the first plurality of $N_{SD}$ values.

3. The method of claim 1, where processing the plurality of encoding parameters comprises retrieving the second encoding parameter $N_{SD,short}$ from a table comprising:
    a first plurality of $N_{SD,short}$ values for resource unit sizes; and
    a second plurality of $N_{SD,short}$ values for aggregated resource unit sizes, each of which is a sum of at least two $N_{SD,short}$ values from the first plurality of $N_{SD,short}$ values.

4. The method of claim 1, where the first encoding parameter $N_{SD}$ is selected from a plurality of encoding parameters comprising:
    $N_{SD}$=72 for a first aggregated resource unit (52+26);
    $N_{SD}$=126 for a second aggregated resource unit (106+26);
    $N_{SD}$=702 for a third aggregated resource unit (484+242);
    $N_{SD}$=1448 for a fourth aggregated resource unit (996+484);
    $N_{SD}$=1404 for a fifth aggregated resource unit (484+242);
    $N_{SD}$=1682 for a sixth aggregated resource unit (996+(484+242));
    $N_{SD}$=2428 for a seventh aggregated resource unit (2×996+484);
    $N_{SD}$=2940 for an eighth aggregated resource unit (3×996);
    $N_{SD}$=3408 for a ninth aggregated resource unit (3×996+484); and
    $N_{SD}$=3920 for a tenth aggregated resource unit (4×996).

5. The method of claim 1, where the second encoding parameter $N_{SD,short}$ is selected from a plurality of encoding parameters comprising:
    $N_{SD,short}$=18 for a first aggregated resource unit (52+26) without dual carrier modulation (DCM);
    $N_{SD,short}$=30 for a second aggregated resource unit (106+26) without DCM;
    $N_{SD,short}$=180 for a third aggregated resource unit (484+242) without DCM;
    $N_{SD,short}$=360 for a fourth aggregated resource unit (996+484) without DCM;
    $N_{SD,short}$=360 for a fifth aggregated resource unit (484+242) without DCM;
    $N_{SD,short}$=420 for a sixth aggregated resource unit (996+(484+242)) without DCM;
    $N_{SD,short}$=612 for a seventh aggregated resource unit (2×996+484) without DCM;
    $N_{SD,short}$=732 for an eighth aggregated resource unit (3×996) without DCM;
    $N_{SD,short}$=852 for a ninth aggregated resource unit (3×996+484) without DCM; and
    $N_{SD,short}$=984 for a tenth aggregated resource unit (4×996) without DCM.

6. The method of claim 1, where the second encoding parameter $N_{SD,short}$ is selected from a plurality of encoding parameters comprising:

$N_{SD,short}=8$ for a first aggregated resource unit (52+26) with dual carrier modulation (DCM);

$N_{SD,short}=14$ for a second aggregated resource unit (106+26) with DCM;

$N_{SD,short}=90$ for a third aggregated resource unit (484+242) with DCM;

$N_{SD,short}=180$ for a fourth aggregated resource unit (996+484) with DCM;

$N_{SD,short}=180$ for a fifth aggregated resource unit (484+242) with DCM;

$N_{SD,short}=210$ for a sixth aggregated resource unit (996+(484+242)) with DCM;

$N_{SD,short}=306$ for a seventh aggregated resource unit (2×996+484) with DCM;

$N_{SD,short}=366$ for an eighth aggregated resource unit (3×996) with DCM;

$N_{SD,short}=426$ for a ninth aggregated resource unit (3×996+484) with DCM; and $N_{SD,short}=492$ for a tenth aggregated resource unit (4×996) with DCM.

7. The method of claim 1, further comprising:
determining a duration of a packet extension field that follows the last symbol based on the selected padding boundary and a nominal packet extension value that is longer than 16 μs and that requires only one packet extension ambiguity signaling bit; and
appending the packet extension field following the last symbol.

8. The method of claim 7, where the nominal packet extension value is less than or equal to 20 μs for any guard interval duration used to transmit the data unit.

9. The method of claim 7, where the nominal packet extension value is less than or equal to 24 μs for a guard interval duration of 1.6 μs used to transmit the data unit.

10. The method of claim 7, where the nominal packet extension value is less than or equal to 28 μs for a guard interval duration of 3.2 μs used to transmit the data unit.

11. The method of claim 1, further comprising:
choosing an updated padding boundary that is larger or equal to a minimum padding boundary required by the second STA device;
determining a duration of a packet extension field that follows the last symbol based on the updated padding boundary and a nominal packet extension value that is less than or equal to 16 μs; and
appending the packet extension field following the last symbol.

12. The method of claim 1, further comprising:
determining a duration of a packet extension field that follows the last symbol based on the selected padding boundary and a maximum nominal packet extension value that is between 28-40 μs and that requires only two packet extension ambiguity signaling bits; and
appending the packet extension field following the last symbol.

13. A method for generating a data unit at a first station (STA) device for transmission to a second STA device in a wireless area network in accordance with a communication protocol which allows multiple resource units to be assigned to a single user and/or supports transmission bandwidth more than 160 MHz and/or more than 8 spatial streams and/or, comprising:
determining a number of information bits $N_{EXCESS}$ that are available for inclusion in a last symbol of a plurality of data symbols;
processing a plurality of encoding parameters, comprising a first encoding parameter $N_{SD}$ specifying a number of data tones in a full symbol and a second encoding parameter $N_{SD,short}$ specifying a number of data tones that is approximately one-fourth of the number of data tones in a full symbol, to select a padding boundary from a plurality of pre-defined padding boundaries in the last symbol that will most closely include the number of information bits $N_{EXCESS}$ in the last symbol;
appending a first number of padding bits to information bits to fill up to the selected padding boundary in the last symbol, thereby generating pre-encoded data bits;
encoding, for data transmission, the pre-encoded data bits to generate encoded output bits; and
appending a second number of padding bits to the encoded output bits to fill up the last symbol,
determining a duration of a packet extension field that follows the last symbol based on at least the selected padding boundary and a maximum nominal packet extension value that is longer than 16 μs; and
appending the packet extension field following the last symbol.

14. The method of claim 13, where the maximum nominal packet extension value is 20 μs for any guard interval duration used to transmit the data unit and requires only one packet extension ambiguity signaling bit.

15. The method of claim 13, where the maximum nominal packet extension value is 24 μs for a guard interval duration of 1.6 μs used to transmit the data unit and requires only one packet extension ambiguity signaling bit.

16. The method of claim 13, where the maximum nominal packet extension value is 28 μs for a guard interval duration of 3.2 μs used to transmit the data unit and requires only one packet extension ambiguity signaling bit.

17. The method of claim 13, where the maximum nominal packet extension value is between 28-40 μs and requires only two packet extension ambiguity signaling bits.

18. The method of claim 13, where at least the first encoding parameter $N_{SD}$ is specified for an aggregated resource unit size that is allowed as a sum of $N_{SD}$ values for at least two other resource units.

19. The method of claim 18, where processing the plurality of encoding parameters comprises retrieving the first encoding parameter $N_{SD}$ from a table comprising:
a first plurality of $N_{SD}$ values for a first set of resource unit sizes; and
a second plurality of $N_{SD}$ values for aggregated resource unit sizes, each of which is a sum of at least two $N_{SD}$ values from the first plurality of $N_{SD}$ values.

20. The method of claim 18, where processing the plurality of encoding parameters comprises retrieving the second encoding parameter $N_{SD,short}$ from a table comprising:
a first plurality of $N_{SD,short}$ values for resource unit sizes; and
a second plurality of $N_{SD,short}$ values for aggregated resource unit sizes, each of which is a sum of at least two $N_{SD,short}$ values from the first plurality of $N_{SD,short}$ values.

21. An apparatus for transmitting orthogonal frequency division multiplexing (OFDM) symbols for a data unit in a wireless personal area network in accordance with IEEE 802.11be protocol, comprising:
a transceiver to exchange data with a wireless device;
a processor; and
a memory storing instructions that, when executed by the processor, cause the apparatus to:
determine a number of information bits $N_{EXCESS}$ that are available for inclusion in a last symbol of a plurality of OFDM data symbols;

select a padding boundary from a plurality of pre-defined padding boundaries in the last OFDM symbol that will most closely include the number of information bits $N_{EXCESS}$ in the last OFDM symbol by processing a plurality of encoding parameters, comprising a first encoding parameter $N_{SD}$ specifying a number of data tones in a full OFDM symbol and a second encoding parameter $N_{SD,short}$ specifying a number of data tones that is approximately one-fourth of the number of data tones in a OFDM full symbol, where at least the first encoding parameter $N_{SD}$ is specified for an aggregated resource unit size that is allowed as a sum of $N_{SD}$ values for at two other resource units;

append a first number of padding bits to the number of information bits $N_{EXCESS}$ to fill up to the selected padding boundary in the last OFDM symbol, thereby generating pre-encoded data bits;

encode, for data transmission, the pre-encoded data bits to generate encoded output bits;

append a second number of padding bits to the encoded output bits to fill up the last OFDM symbol;

determine a duration of a packet extension field that follows the last OFDM symbol based on the selected padding boundary and a nominal packet extension value that is longer than 16 µs and that requires only one packet extension ambiguity signaling bit; and append the packet extension field following the last OFDM symbol.

22. A method for operating a receiving station comprising:

receiving, via a wireless channel, a packet comprising one or more preamble OFDM symbols and one or more data field OFDM symbols;

decoding the one or more preamble OFDM symbols to extract an a-factor, a packet length parameter, data modulation parameters, and at least a first packet extension ambiguity bit for the packet;

calculating the number of symbols in the data field portion and a duration of a packet extension field from a first subset of the data modulation parameters, the packet extension ambiguity bit and the packet length parameter, where the packet extension field is longer than 16 µs and requires only one packet extension ambiguity signaling bit to be decoded from the one or more preamble OFDM symbols;

processing a resource unit allocation parameter from the data modulation parameters to identify a first decoding parameter value $N_{SD}$ specifying a number of data tones in a full symbol and a second decoding parameter value $N_{SD,short}$ specifying a number of data tones that is approximately one-fourth of the number of data tones in a full symbol, where at least the first decoding parameter value $N_{SD}$ is specified for an aggregated resource unit size that is allowed as a sum of decoding parameter values $N_{SD}$ for at least two other resource units assigned to the receiving station;

determining data decoding parameters based on a second subset of the data modulation parameters, the first decoding parameter value $N_{SD}$, the second decoding parameter value $N_{SD,short}$, and the a-factor which identifies a boundary for a last modulated data subcarrier from a plurality of pre-defined padding boundaries in a last symbol from the data field portion; and decoding the data field portion to extract data from a plurality of resource units assigned to the receiving station based on the data decoding parameters.

* * * * *